(12) United States Patent
Neto

(10) Patent No.: US 8,047,130 B2
(45) Date of Patent: Nov. 1, 2011

(54) OPPOSING PAIRED PEELING CUPS FOR FRUIT JUICE EXTRACTION DEVICES, AND SAID DEVICES COMPRISING SAID CUPS

(76) Inventor: Carlos Mendes Neto, Araraquara (BR)

( * ) Notice: Subject to any disclaimer, the term of this patent is extended or adjusted under 35 U.S.C. 154(b) by 1205 days.

(21) Appl. No.: 11/735,196

(22) Filed: Apr. 13, 2007

(65) Prior Publication Data

US 2008/0250942 A1    Oct. 16, 2008

(51) Int. Cl.
*B02C 15/00*    (2006.01)
(52) U.S. Cl. ........................................................ 99/510
(58) Field of Classification Search ............... 99/495, 99/509, 510, 539, 540; 100/108, 213
See application file for complete search history.

(56) References Cited

U.S. PATENT DOCUMENTS

| | | | |
|---|---|---|---|
| 1,514,094 A | 11/1924 | Noble |
| 2,116,325 A | 5/1938 | Rogers |
| 2,332,177 A | 10/1943 | Smith |
| 2,346,571 A | 4/1944 | Delay |
| 2,419,545 A | 4/1947 | Gray et al. |
| 2,420,679 A | 5/1947 | Pipkin |
| 2,420,681 A | 5/1947 | Peterson |
| 2,463,125 A | 3/1949 | Smith et al. |
| 2,522,800 A | 9/1950 | Quiroz |
| 2,534,554 A | 12/1950 | Kahre |
| 2,540,345 A | 2/1951 | Pipkin |
| 2,649,730 A | 8/1953 | Hait |
| 2,649,731 A | 8/1953 | Polk, Sr. et al. |
| 2,659,298 A | 11/1953 | Hudson |
| 2,713,434 A | 7/1955 | Belk |
| 2,723,618 A | 11/1955 | Matthews |
| 2,748,693 A | 6/1956 | Drain et al. |
| 2,780,988 A | 2/1957 | Belk et al. |
| 2,846,943 A | 8/1958 | Belk |
| 2,856,846 A | 10/1958 | Belk |
| 3,040,864 A | 6/1962 | Belk |

(Continued)

FOREIGN PATENT DOCUMENTS

CA    2347814    2/2001

(Continued)

*Primary Examiner* — Duc Nguyen
*Assistant Examiner* — Mark Woodall
(74) *Attorney, Agent, or Firm* — David G. Maire; Joseph Fischer; Beusse Wolter Sanks Mora & Maire, P.A.

(57) ABSTRACT

One embodiment of the present invention comprises a pair of intermeshable fruit juice extraction peeler cups (100, 150) comprising respective blades (106, 156) that are arranged so as to intermesh to peel and extract juice from a fruit introduced into a space 107 there between during an extraction stroke. Considering one peeler cup (150), its blades' distal ends 158 collectively define a shape referred to as a Mendesaddle shape (160). The Mendesaddle shape (160) comprises a top opening (164) and a bottom opening (166) extending toward a rearward end (154) of the peeler cup (150). A fruit enters the space (107) through an open area (139) that comprises top opening (164) and a corresponding top opening (114) of the mated peeler cup (100). Also, considering the bottom openings (166, 116), a juice-extracted fruit core may drop through an open area (141) provided by these, wherein, nonetheless, the size of the open area (141) (and also of each of the bottom openings 166 and 116) is effective to retain the whole fruit upon entry of the whole fruit into the space 107. Various features of the invention provide for more reliability and fewer misfeeds of fruit.

14 Claims, 8 Drawing Sheets

U.S. PATENT DOCUMENTS

| | | |
|---|---|---|
| 3,053,170 A | 9/1962 | Cook |
| 3,086,455 A | 4/1963 | Belk |
| 3,162,114 A | 12/1964 | Quiroz |
| 3,236,175 A | 2/1966 | Belk |
| 3,269,301 A | 8/1966 | Krause |
| 3,429,257 A | 2/1969 | Belk |
| 3,682,092 A | 8/1972 | Breton et al. |
| 3,736,865 A | 6/1973 | Hait |
| 3,866,528 A | 2/1975 | Montagroni |
| 4,154,163 A | 5/1979 | Niemann |
| 4,300,449 A | 11/1981 | Segredo |
| 4,309,944 A | 1/1982 | Frost et al. |
| 4,376,409 A | 3/1983 | Belk |
| 4,391,185 A | 7/1983 | Stanley |
| 4,459,906 A | 7/1984 | Cound et al. |
| 4,700,620 A | 10/1987 | Cross |
| 4,905,586 A | 3/1990 | Anderson et al. |
| 4,917,007 A | 4/1990 | Nelson |
| 4,922,813 A | 5/1990 | Compri |
| 4,922,814 A | 5/1990 | Anderson et al. |
| 4,951,563 A | 8/1990 | Warren et al. |
| 4,961,374 A | 10/1990 | Lee |
| 5,035,174 A | 7/1991 | Seal, Jr. |
| 5,070,778 A | 12/1991 | Cross et al. |
| 5,097,757 A | 3/1992 | Antonio |
| 5,156,872 A | 10/1992 | Lee |
| 5,170,700 A | 12/1992 | Anderson et al. |
| 5,182,984 A | 2/1993 | Wagner |
| 5,199,348 A | 4/1993 | Cimenti |
| 5,249,514 A | 10/1993 | Otto et al. |
| 5,331,887 A | 7/1994 | Beck |
| 5,339,729 A | 8/1994 | Anderson |
| 5,381,730 A | 1/1995 | Kim |
| 5,396,836 A | 3/1995 | Kim |
| 5,483,870 A | 1/1996 | Anderson et al. |
| 5,655,441 A | 8/1997 | Mendes |
| 5,720,218 A | 2/1998 | Mendes |
| 5,720,219 A | 2/1998 | Mendes |
| 5,802,964 A | 9/1998 | Mendes |
| 6,161,475 A | 12/2000 | Coppelletti |
| 7,000,534 B1 | 2/2006 | Mendes |
| 2005/0028690 A1 | 2/2005 | Neto |
| 2005/0199138 A1* | 9/2005 | Neto .......................... 99/510 |

FOREIGN PATENT DOCUMENTS

| | | |
|---|---|---|
| EP | 0442535 A1 | 8/1991 |
| EP | 0757896 B1 | 2/1997 |
| GB | A-753-988 | 8/1956 |
| GB | 2 116 021 A | 9/1983 |

* cited by examiner

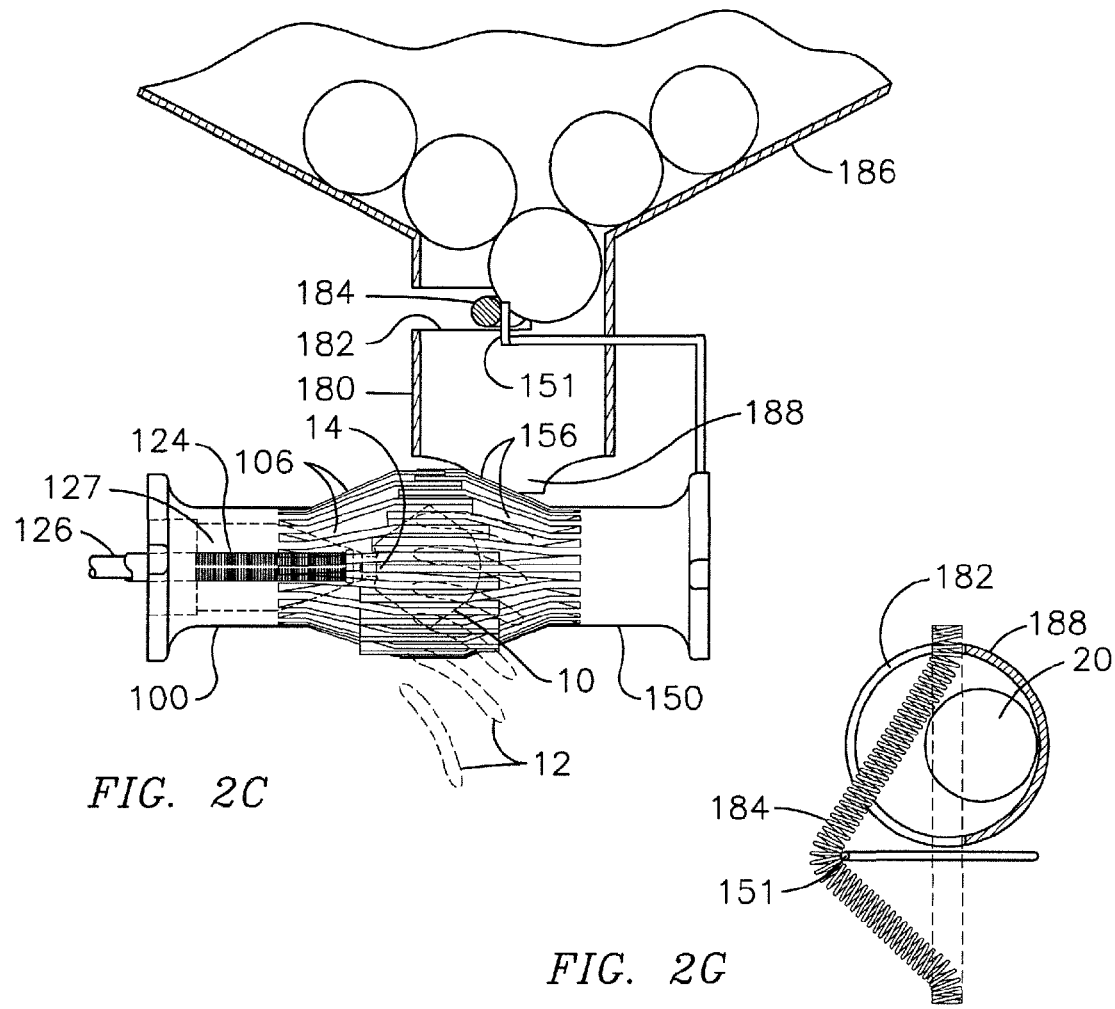
FIG. 2C
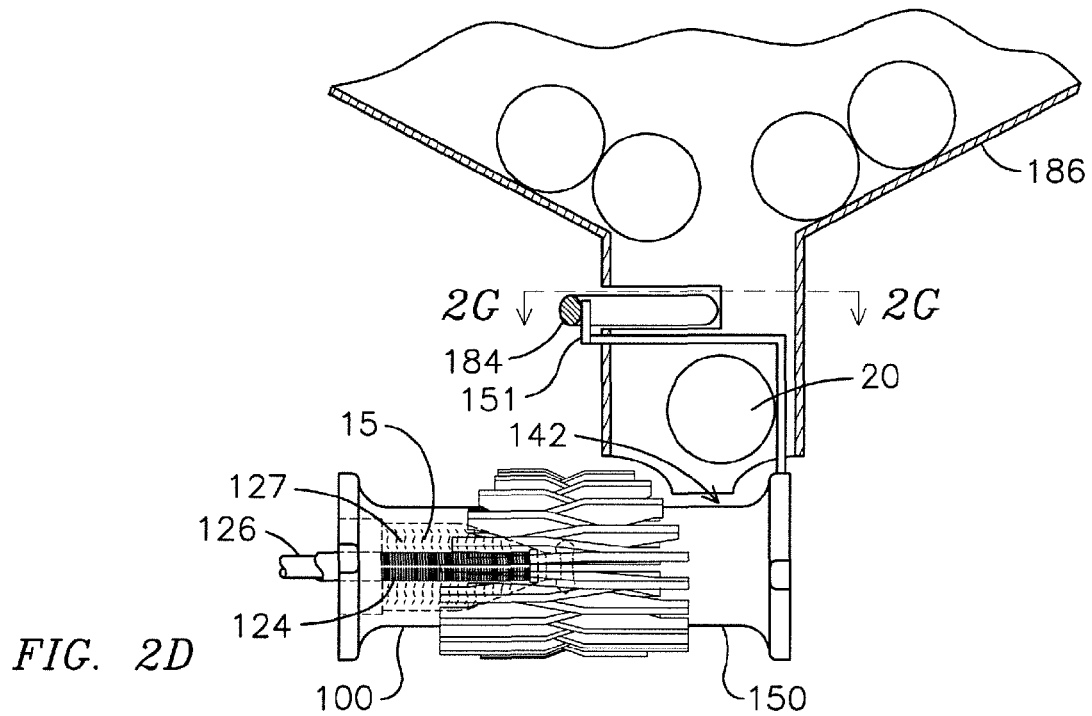
FIG. 2D
FIG. 2G

OPPOSING PAIRED PEELING CUPS FOR FRUIT JUICE EXTRACTION DEVICES, AND SAID DEVICES COMPRISING SAID CUPS

FIELD OF INVENTION

The invention generally relates to a fruit juice extraction device comprising two paired opposing peeler cups that compress fruit to obtain extracted juice, and particularly to features of the paired peeler cups that are effective at relatively higher production rates and/or with relatively smaller fruit.

BACKGROUND OF THE INVENTION

For decades commercial-scale fruit juice extraction, such as the extraction of citrus fruits including oranges and grapefruit, largely has utilized fruit juice extraction devices that have a vertical orientation of interdigitating extractor cups. Examples of such technology are found in U.S. Pat. Nos. 2,649,730, 2,780,988, and later patents assigned to FMC Corporation. In essence, fruit introduced from a side port falls into a lower, fixed extractor cup, at the bottom of which is an entrance of a filter receiving tube, and an upper, moveable extractor cup lowers over this along a vertical axis, causing most fruit rind (or peel) to be ejected through an upper, centered, annular passageway while forcing juice-laden pulp, and plugs of peel at the top and bottom of the juice-laden pulp, into a lower strainer tube. These plugs are further compressed as they travel down the strainer tube, releasing peel oils. The oils from the rind are known to adversely affect flavor and shelf life. It is noted that these extraction devices also comprise a reciprocating orifice tube within the strainer tube which is reciprocated in a relationship with the upper, moveable extractor cup's movement. During the extraction cycle, the majority of the remaining peel is forced, by virtue of the shapes of the contacting surfaces of the interdigitating extractor cups, through the upper, centered annular passageway of the moveable upper extractor cup so that such peel exits near above this cup.

In U.S. Pat. No. 4,309,943, modifications of this vertical juice extraction approach were made to increase production rate. Also, a high speed feeding device for use with this extractor was described in U.S. Pat. No. 4,309,944. These patents identify a general interest in increasing production rates in commercial fruit juice extraction facilities. Also, U.S. Pat. No. 4,700,620, assigned to FMC Corporation, teaches an improvement to the above-referenced FMC extraction devices in which a cam controls movement of an orifice tube within the strainer tube, for the stated purpose of reducing contact of the extracted juice with the freshly cut surfaces of the fruit skin. U.S. Pat. No. 5,070,778, also assigned to FMC Corporation, teaches an approach to reduction of peel oil by introduction of a plurality of apertures in the annular cutter head adjacent the annular passageway through which the fruit rind is ejected during the juicing cycle of these units.

The present inventor previously invented, and received patents for, a fruit juice extraction device that in its depicted embodiments is oriented in a substantially horizontal manner, and that provides opposing peeler cups that are effective to press and shear the fruit peel into slivers during the extraction cycle. The latter is based on the configuration and arrangement of the opposing intermeshable peeler blades of the cups. U.S. Pat. Nos. 5,655,441, 5,720,218, 5,802,964, and 5,655,441 describe such device as exemplified in a small, single-cup-pair device. Also, various improvements have been made in the invention, including those directed to drive mechanisms for multi-cup commercial production extraction units. These are described in the publication of Canadian Patent number CA 2347814, and in U.S. Patent Application publication numbers 2005/0028690 and 2005/0199138. U.S. Patent Application publication number 2006/0201345, a continuation of the above referenced patents issued to Applicant, further claims aspects of the invention.

Embodiments of such exemplified horizontal extraction devices have been demonstrated to achieve a fruit extraction with substantially less peel oil in the juice compared to models of the noted vertically oriented interdigitating extractor cups. Notwithstanding these improvements, a need remains to improve the technology of the opposing peeler cups to provide for improved production rates whilst maintaining or improving the quality of the extracted juice. Such need is directed to an economic interest and value in achieving relatively higher production rates for commercial juice extraction units.

BRIEF DESCRIPTION OF THE DRAWINGS

The invention is explained in following description in view of the drawings that show:

FIGS. 2A-2F provide depictions of two opposing peeler cups shown in different positions of the extraction cycle, the peeler cups shown in side view below a chute and tray shown in cut-away view. FIG. 2G is a cross-sectional schematic view taken along line G-G of FIG. 2D, showing details of a fruit feeding mechanism in the chute.

DETAILED DESCRIPTION OF EMBODIMENTS OF THE INVENTION

Figure 1A:
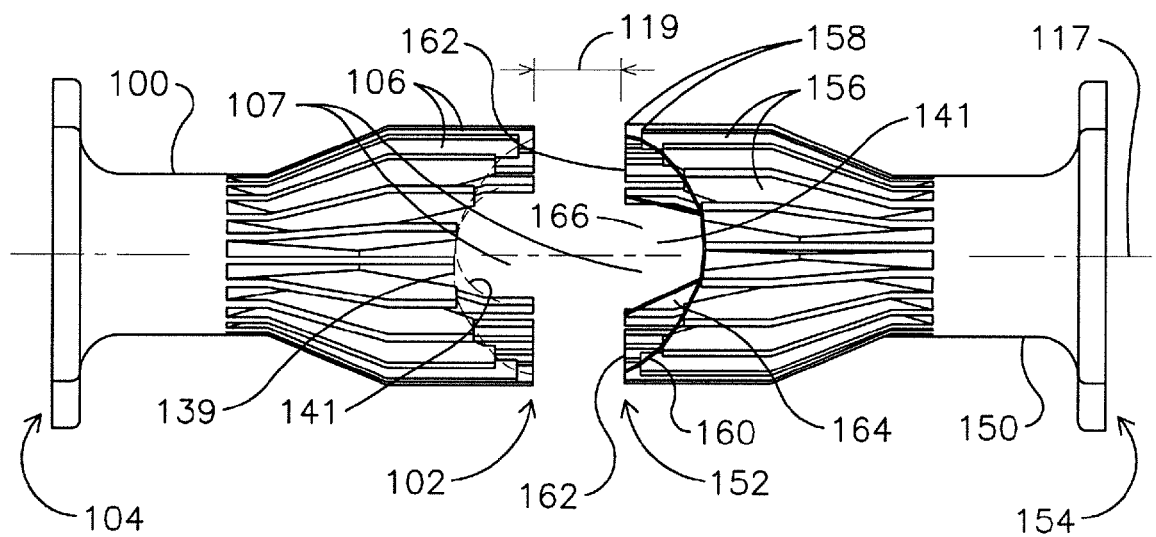
FIG. 1A provides a top view of a pair of intermeshable fruit juice extraction peeler cups.

As indicated above, the Applicant's previous inventions in the field of fruit extraction devices have advanced the art in part by providing a set of opposed intermeshable fixed and mobile peelers (also and more generally referred to herein as peeler cups), each comprising a plurality of radially extending and spaced apart blades that intermesh with the blades of the other peeler cup. During the extraction stroke, as these peelers compress the fruit, these intermeshing blades are effective to strip the peel of the fruit away, such as in discrete slivers. Also, a piston, slaved to a drive (which may include a drive motor and drive linkage), cyclically pushes the juice-extracted cores of fruits from a filtering tube after each extraction stroke, on the return stroke (when a subsequent fruit may be loaded). In part, as to the blades' operation, this approach differs from the above-referenced patents assigned to FMC, which generally operate to force most of the peel through a centered annular passageway of one of the cups, and which ultimately introduce two peel plugs, from opposite sides of each fruit, into the strainer tube. As noted above other advances, exemplified in other of Applicant's already filed patent applications, are directed to drive mechanisms that have particular use for commercial, multi-peeler cup pair juice extraction devices.

Further, an aspect of Applicant's previously filed invention embodiments is the substantially horizontal alignment of opposed intermeshable peeler cups in exemplary devices. This provides for fruits to drop by gravity into a space formed by the peeler cups when in an open position, and the juice-extracted fruit cores, after expulsion from the filtering tube by the piston moving therein, to fall by gravity out of the space, such as to a refuse collection area below the peeler cups. As to the expulsion of the juice-extracted fruit cores, this was through an opening formed by a sufficient separation between the opposed peeler cups to allow such passage. In such prior art embodiments of Applicant, a plurality of longer blades, disposed along the bottom of the peeler cups in relation to the space formed therein, served to support the fruit upon and after its entry into the space. Thus, in various such embodiments, the opposed intermeshable peeler cups would separate sufficiently to allow entry of the fruit, and the plurality of longer blades were substantially the only blades crossing a horizontal separation between the opposed intermeshable peeler cups at that point in the extraction cycle. Further, one or more such longer blades were positioned at the bottom of a respective peeler cup, suitable for catching the entering fruit as it dropped into the space.

Based on various observations, the Applicant has appreciated that there are conflicting functional objectives for certain of the peeler cup blades. These conflicting objectives regard not only to their interior and exterior contours, but also pertain to their overall length and that length in relation to adjacent blades. The refinements described herein provide, in certain embodiments, a synergistic effect by combining a number of advances over the earlier peeler cup designs. These refinements balance the conflicting objectives and attain a higher production rate linked with a more robust and predictable fruit feeding system coordinated with the higher production rate.

As Applicant has advanced the art with a focus on increasing production rates for commercial units while maintaining juice yield and quality, he has appreciated difficulties with older peeler cup designs when the fruit feeding rate exceeds certain levels. Various aspects of the present invention are directed to a peeler cup design comprising features that advance the art and allow for increased production rates of fruit extraction devices when measured as fruits extracted per minute per peeler cup set. Other aspects of the present invention have been found to decrease peel oil contamination of the extracted juice, particularly when relatively smaller fruits are being extracted within a peeler cup set having a relatively large space compared to these fruits.

The various aspects of the present invention are described using exemplary embodiments depicted in the figures. However, these examples are not meant to be limiting of the scope of the claims appended hereto.

In first exemplary embodiment, a pair of intermeshable fruit juice extraction peeler cups 100 and 150 are shown from a top view in FIG. 1A. Peeler cup 100 comprises a forward end 102, a rearward end 104, and comprises a plurality of radially disposed and spaced apart peeling blades 106 that partially define a space 107 into which a fruit (not shown) may fall. Likewise peeler cup 150 comprises a forward end 152, a rearward end 154, and comprises a plurality of radially disposed and spaced apart peeling blades 156 that also partially define the space 107 into which the fruit (not shown) may fall. The blades 106 and 156 are arranged so as to intermesh. As explained below, after such fruit enters the space 107 and one of the peeler cups 100 and 150 moves toward the other in an extraction stroke along a longitudinal axis 117, the fruit is peeled and compressed for extraction of its juice as the blades 106 and 156 intermesh.

Figure 1B:
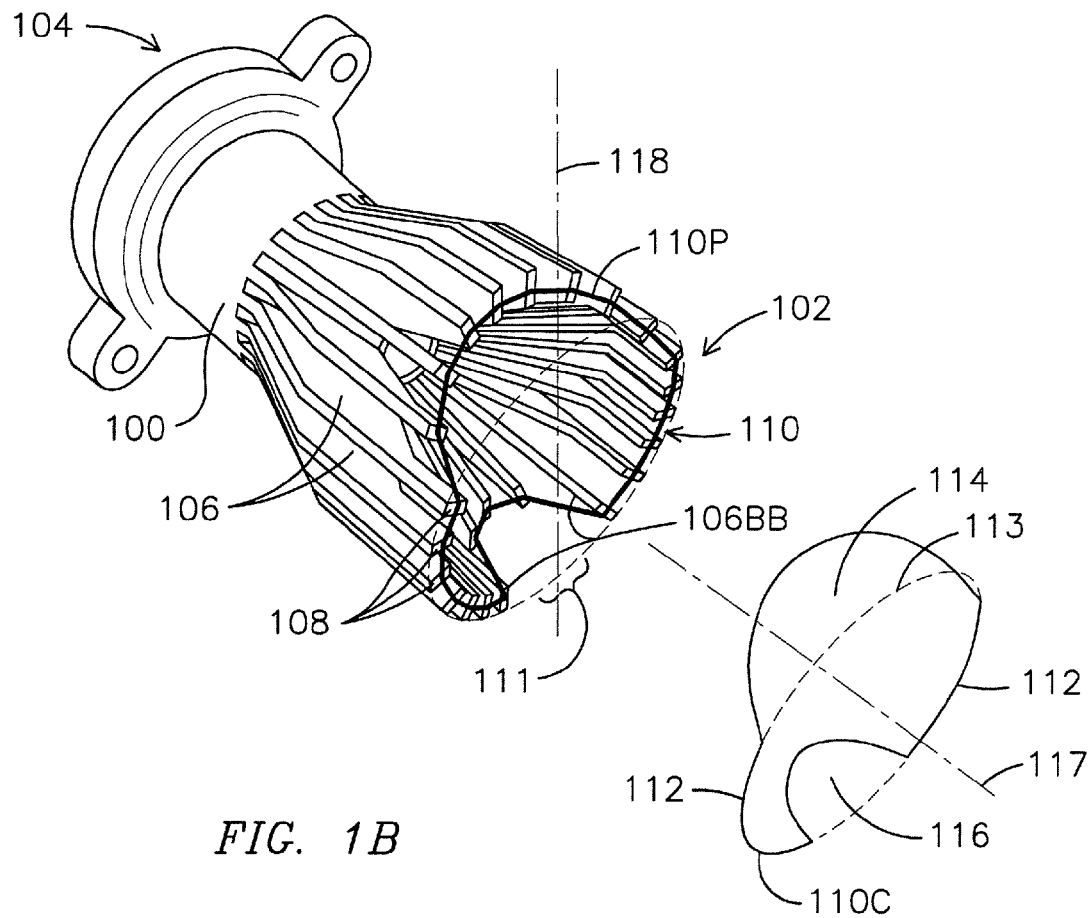
FIG. 1B provides a perspective view of one of the peeler cups of FIG. 1A.

Further to aspects of the invention, considering peeler cup 100 in a perspective view in FIG. 1B, its peeler blades 106 each comprise distal ends 108 that collectively define a shape, having in some aspects features of a geometric category of shapes known as a "saddle," and herein referred to as a "Mendesaddle shape" 110. As shown in the alternative in FIG. 1B, the Mendesaddle shape 110 may be depicted based on the distal ends 108 as a polygon (110P), or may be smoothed to yield a curvilinear depiction (110C).

The Mendesaddle shape 110 comprises forwardly disposed lateral arcs 112 from which a top opening 114 and a bottom opening 116 extend toward the rearward end 104 of the peeler cup 100. While the lateral arcs 112 are depicted in FIG. 1B as formed from a single circle 113 (partly shown with dashed lines) and in a plane perpendicular to the longitudinal axis 117 of the peeler cup 100, this is not meant to be limiting. Indeed, variations in the shape (such as conforming to an angled ellipse rather than circle 113) and extent of the lateral arcs 112 are within the scope of the invention.

Referring again to FIG. 1A, it is appreciated that peeler cup 150 likewise has a Mendesaddle shape 160 at its distal ends 158 of its blades 156, that Mendesaddle shape 160 being a mirror image of the Mendesaddle shape 110 of peeler cup 100 and comprising lateral arcs 162, a top opening 164, and a bottom opening 166.

Considering the top openings 114 and 164 together, these provide an open area 139 that is sized such that a whole fruit (not shown) may drop into the space 107 with no or little separation of the most distal of the respective distal ends 108 and 158. Also, considering the bottom openings 116 and 166, a juice-extracted fruit core (not shown) may drop through an open area 141 provided by these, wherein, nonetheless, the size of the open area 141 (and also of each of the bottom openings 116 and 166) is effective to retain the whole fruit upon entry of the whole fruit into the space 107. It is noted that the width of the bottom opening 116 is defined by the nearest radial blades, identified in FIG. 1B as 106-BB, and these help define the size of the bottom opening 116. In contrast to prior art configurations, at a bottom-most portion 111 of the bottom opening 116 no blades are there to obstruct it, thereby providing for a greater probability of complete disposal of juice-extracted cores through the bottom openings 116 and 166. By bottom-most portion, such as 111 of FIG. 1B is meant the lowest portion of the bottom opening 116 based on positioning relative to gravity, and more specifically in various embodiments that arc portion of the circle 113 that lies within 10 degrees, or alternatively within 20 degrees to either side of a vertical axis 118 that divides the bottom opening 116. Also, when in the maximum open position of an extraction stroke cycle, as shown in FIG. 1A, the peeler cups are spaced apart by a relatively narrow lateral gap 1 19 measured between distal ends 108 of opposing lateral arcs 1 12.

A Mendesaddle shape such as depicted as 110 in FIGS. 1A and 1B includes a birecessed circuloform shape with the following aspects. A birecessed circuloform, such as 110 in FIG. 1B, comprises a first, top incurving defining a first, top recess (e.g., top opening 114) that extends rearward from a forward peeler cup end and that is sized to permit entry of a predetermined portion of a fruit (e.g., about half of a whole fruit in FIGS. 1A, 1B, and a whole fruit for FIG. 4A embodiment, below), and a second, bottom incurving defining a second, bottom recess (e.g., bottom opening 116) that extends rearward from a forward peeler cup end and that is sized to permit, in combination with bottom opening 166, passage of a juice-extracted core from the space formed by the peeler cup. Various shapes, such as the above-noted lateral arcs, may be disposed laterally between the top and the bottom recesses.

This shape provides better control over the fruit from the point that the fruit drops through the top of the respective cups. This contributes to fewer mis-feeds and consequently better quality at greater production rates. Further, the top openings 114 and 164 may be sized so that a fruit may enter the space 107 when there is no separation between the opposed peeler cups 100 and 150, or when there is a relatively small separation during the maximum open position of an extraction stroke cycle (compared with prior art configurations as to the top and lateral blades).

Also as to the shape, the centered bottom openings 116 and 166 provide a clearer exit for juice-extracted fruit cores than prior art embodiments in which one or two longer blades occupied this space. This results in less opportunity for a misfeed due to more effective complete expulsion of residual core material from a prior extraction interfering with a subsequent extraction. Further aspects applicable to this embodiment are discussed following a brief and general summary of aspects of the extraction cycle.

Employing the embodiments depicted in FIGS. 1A and 1B in side schematic views, FIGS. 2A-2F provide depictions of different positions of the extraction cycle. These figures exemplify aspects of the extraction cycle that may apply for any of the embodiments described above and below. Peeler cups 100 and 150 are shown in a side perspective view positioned centered below a chute 180, which is depicted in a cut-away view to show certain features, and from which fruit feed by gravity. The chute 180 comprises a transverse slot 182 in which a tensioned spring 184 is positioned. The spring is tensioned between two bolts (not shown) that fix the spring to the device chassis (not shown). The chute 180 is positioned at the bottom of an angled fruit delivery system 186, also shown in cut-away view. The spring 184 obstructs the chute 180 until it is moved, cyclically, by a trigger rod 151 affixed to the peeler cup 150.

Figure 2A:
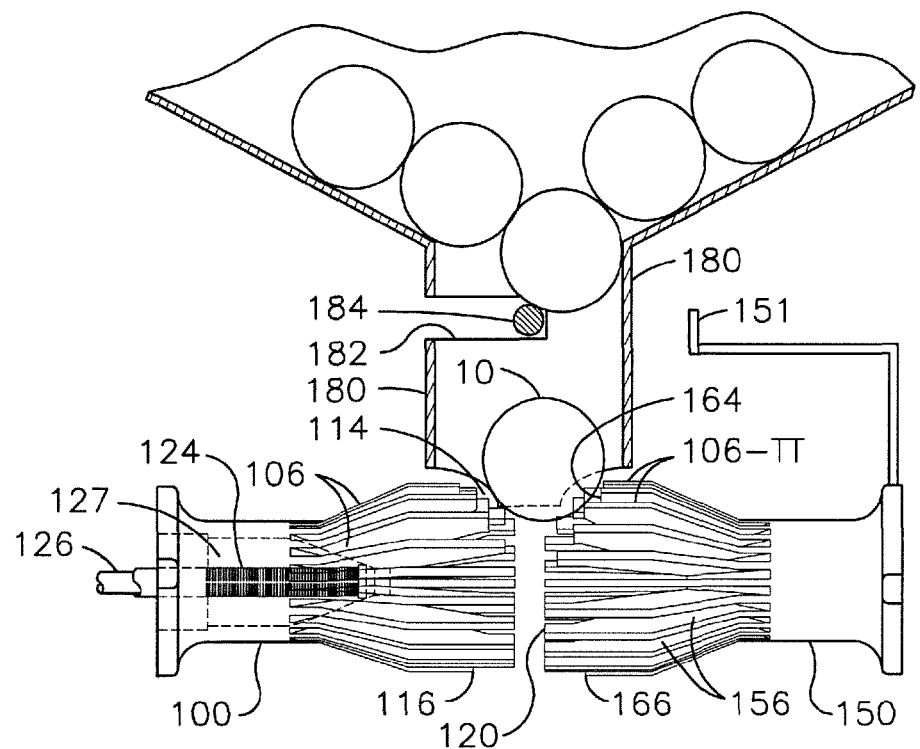

As depicted in FIG. 2A, with peeler cup 150 positioned in the open position a first fruit 10 drops from the outer edges 120 of the top blades 106-TT and into space 107. In actual operation this dropping occurs just before, when, or shortly after the peeler cup 150 reaches its full-open, most remote position from opposing peeler cup 100. The exact timing of the drop of the fruit depends in part on the device speed and size of fruit relative to the overall size of the top openings 114 and 164, and the exact location of the trigger rod 151). As described for FIG. 1B, the nearest radial blades (see 106-BB of FIG. 1B) to the bottom opening 116 are spaced so as to retain the first fruit 10 within the space 107. Also shown is a piston 126, which is slaved to a drive (not shown) within a filtering tube 124. As discussed below, the piston 126 cyclically moves in the filtering tube 124 and during the return strokes pushes the juice-extracted cores of fruits from the filtering tube 124.

Figure 2B:
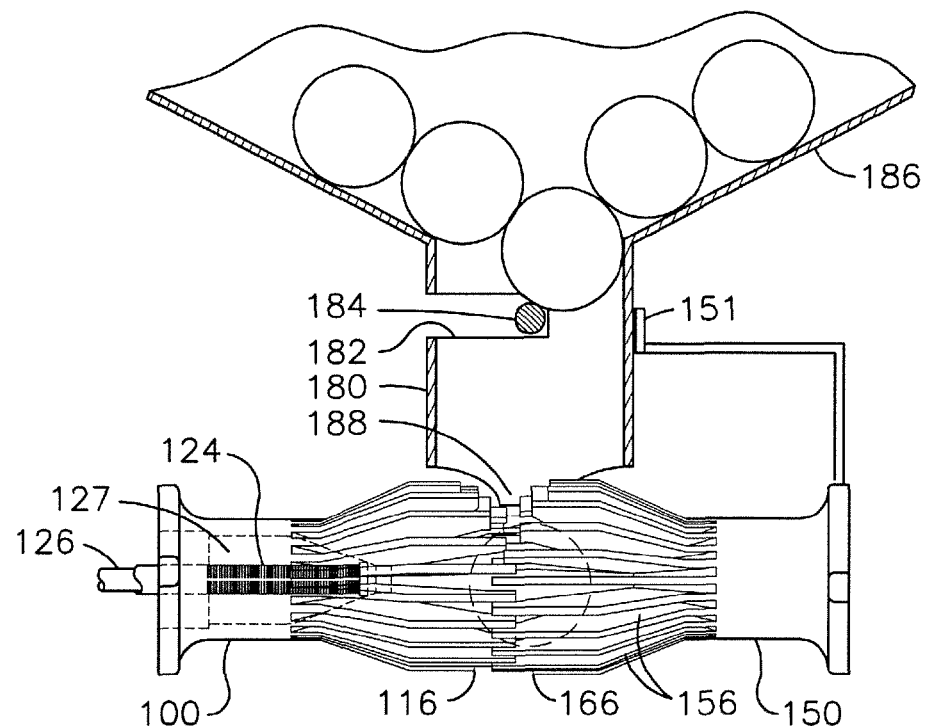

As depicted in FIG. 2B, as the peeler cup 150 begins its extraction stroke the intermeshing of blades 106 and 156 begins and peeler cup 150 closes upon the first fruit 10.

The pressure of the blades 106 and 156 during initial compression upon the first fruit 10 cuts its peel to initiate the peeling process. FIG. 2C shows an intermediate position of the peeler cup 100 in the extraction stroke, wherein both compression and peeling are underway. Slivers 12 of peel of the fruit 10 are shown after exiting from between intermeshing blades 106 and 156. The peeling process continues as the extraction stroke continues, during which time the internal fruit core 14, containing the juice, is forced into a filtering tube 124 positioned centrally in the peeler cup 150. As pressure increases, juice 15 begins to leave the fruit core 14 and enter a collection chamber 127 that surrounds the filtering tube 124 within peeler cup 100. FIG. 2D depicts the extraction stroke nearly completed, and also shows that a trigger rod 151, attached to the moving peeler cup 150, has moved aside the tensioned spring 184 so that second fruit 20 falls below the spring 184. Thus, the second fruit 20, free to fall below the spring 184, will shortly rest upon an extended narrow base rearward region 142 while pressure from the continued closing of the peeler cup 150 forces more juice 15 from the first fruit 10, being compressed, through the filtering tube 124, and then to collection chamber 127 and storage components (not shown).

Figure 2E:
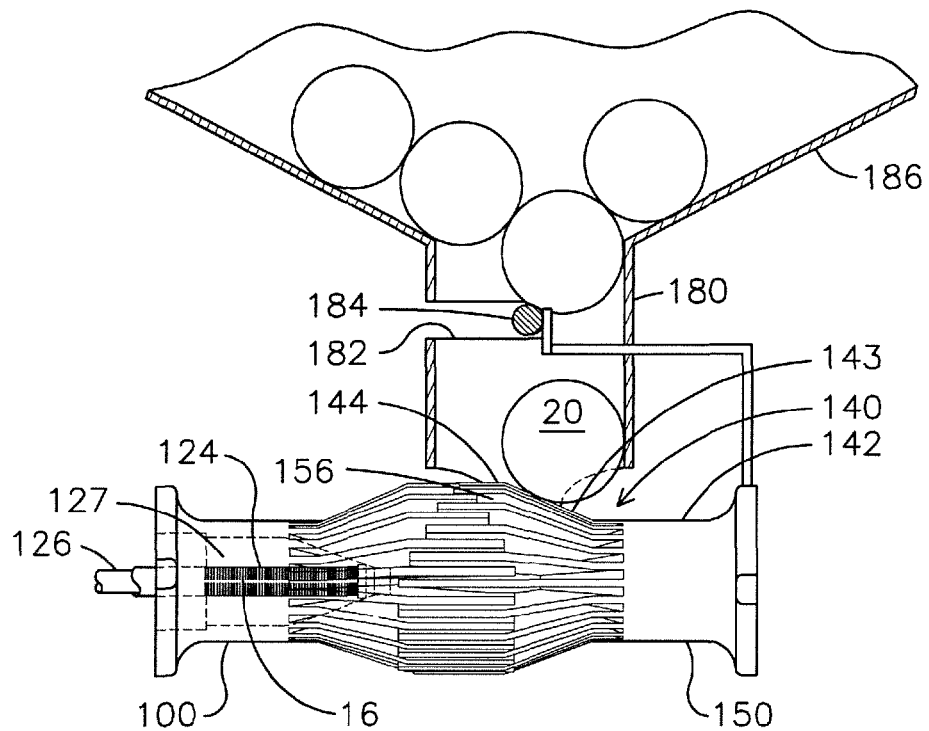

FIG. 2E depicts the return stroke underway. The piston 126, as noted to be generally mechanically slaved to a drive mechanism (not shown) that also may drive peeler cup 150, begins to push a juice-extracted core 16 out of the filtering tube 124. Also, the second fruit 20, entrapped laterally by extensions 188 of the chute 180, is shown rising along an intermediate angled region 143 of the exterior contour 140 of the blades 156 that are disposed along the top of peeler cup 150.

Figure 2F:
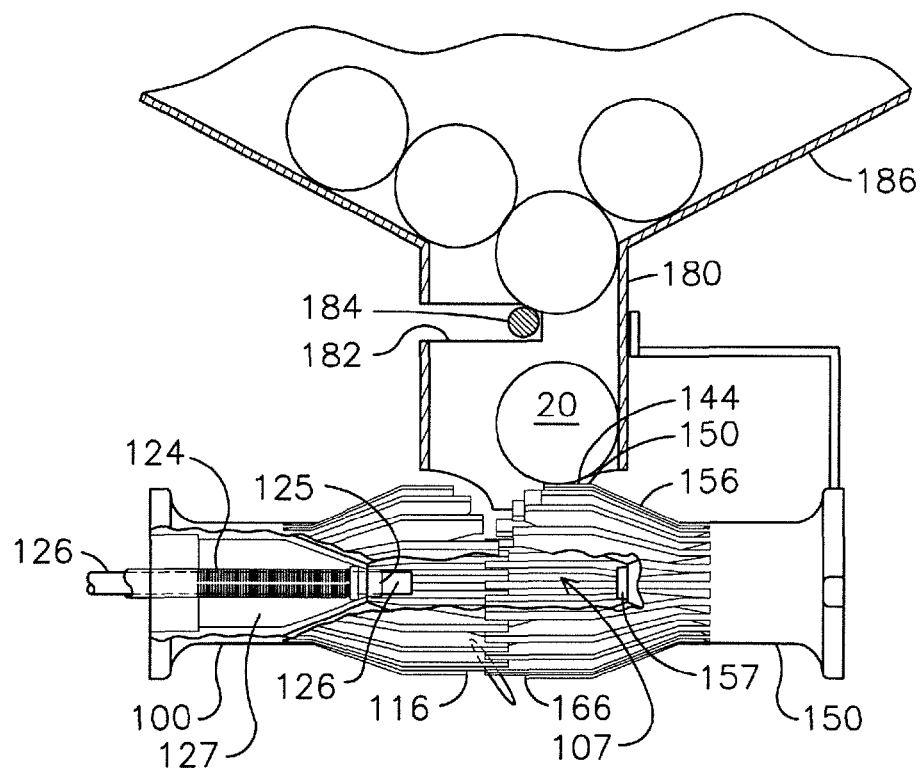

FIG. 2F depicts the return stroke nearly completed. The juice-extracted fruit core 16, having been forced by the piston 126 from the filtering tube 124, is beginning to fall through the bottom openings 116 and 166 of the peeler cups 100 and 150. The exact timing of this may vary, and may be controlled in part by adjustment of the mechanical linkage of the piston 126 with the main drive linkage (not shown) of the drive mechanism that may drive peeler cup 150. Also depicted in FIG. 2F is the second fruit 20 supported on the horizontal portions 144 of the exterior contour 140 of the blades 156 that are disposed along the top of peeler cup 150. The cycle begins again shortly, as described above for FIG. 2A.

It is noted that peeler cup 150 may also comprise an optional concentric central pin 157, shown only in a partial cut-away in FIG. 2F, that may extend for a distance into the space 107 defined in part by the peeler cup 150, and also that the drive linkage may be adjusted so that this compresses a plug of fruit peel (not shown) it is contacting into a distal tip 125 of the filtering tube 124 when the peeler cup 150 is at the end of its extraction stroke. The central pin 157 has been described in previous patents and applications of the Applicant. Also, it is noted that linkage and timing adjustments of the piston 126 may provide for a slight increase in pressure for juicing purposes when such a peel plug has been compressed into the tip 125 by the concentric pin 157.

It is noted that the blades 106 and 156 of the peeler cups 100 and 150 cooperatively intermesh as the peeler cup 100 advances to the peeler cup 150 during the extraction stroke of the juicing cycle. As noted above, this cooperative intermeshing provides for the peeling of the fruit. It is further noted that in some embodiments, given the progressive relative movement of the matched peeler cups toward one another while their intermeshing blades initiate and continue contact with the peel of the fruit, the peeling activity of the blades is about twenty percent completed when sufficient fruit is compressed into the filtering device to result in the beginning of the juicing of the fruit. Thereafter, peeling and juicing occur concurrently, and thereafter, toward the latter 20-30 percent of the juicing period for that fruit, the peeling has ceased and only the compression and juicing occur. Thus, in such embodiments, the peeling starts before the juicing starts, then both peeling and juicing occur simultaneously, and toward the end of the compression part of the juice extraction cycle, juicing occurs after peeling is completed.

Without being bound to a particular theory, the following explanation is provided as to how the various described features are believed to synergistically contribute to fewer misfeeds and higher production rate and juice quality. Referring to FIGS. 2A-F, discussed above, as the peeler cup 100 advances toward the peeler cup 150, the trigger rod 151 actuates the spring 184 toward the end of the extraction stroke, so the latter clears the chute 180 sufficiently so the first fruit 10 falls by gravity (and optionally aided by the weight of fruits above it) below the level of the spring 184, it may first come to rest on the extended narrow rearward base 142. It may remain supported by the extended narrow rearward base 142 for a time period during which the direction of movement of the peeler cup 150 reverses at the end of the extraction stroke (of a fruit, not shown, preceding the first fruit 10). Then, as the peeler cup 100 moves rearward, distancing itself from peeler cup 150, the fruit 10 rolls along the intermediate angled region 143, and thence, prior to falling into space 107, rolls along the length of the horizontal portion 144 of the exterior contour 140. The time on the latter is sufficient to reduce or eliminate an upward trajectory of the fruit 10 that would otherwise have resulted, due to being supported by an exterior contour having an upward angle at its distal end (compare with a prior art exterior contour such as in FIG. 3B). This permits the fruit 10 to more quickly fall by gravity into the space 107 rather than having a tendency to fly more upward, or remain suspended, such as when rolling off an upwardly angled exterior contour. It also is noted that the chute 180 is provided with side extensions 188 that are provided to prevent lateral displacement of the fruits during this staging atop the peeler cup 100.

By thus controlling the travel of each fruit as it is staging atop the peeler cup 150 after dropping below the spring 184 and before it enters the space 107 for extraction, the combination of these features reduces or eliminates such fruit getting damaged prior to extraction, which could result in a failed peeling and extraction, or getting damaged by not completely dropping below the blades 106 and 156 by the time the extraction stroke functionally closes the open area (see 139 of FIG. 1A) formed from top openings 114 and 164 through which the fruit is intended to drop. That is, the more distal horizontal portion 144 of the exterior contour 140, the intermediate angled region 143 (the presence of which is a result of a need to provide blade profile dimensionality effective for the removal of peel strips), and an extended narrow rearward base 142 are effective to provide improved feeding rates, fewer misfeeds and resultant damaged fruits, and overall improved production rates and quality. As to the dimensions of an extended narrow rearward base of the present invention, such as 142, in various embodiments the length of this is set to the length of the maximum nominal size fruit being processed by the peeler cups, as measured by the diameter of the fruit. For example, for a 75 mm cup size (maximum diameter of compression region), the length of the extended narrow rearward base also is 75 mm. Also, it is appreciated that in various embodiments one or two, rather than all three, of these features may be provided.

FIG. 2G is a cross-sectional schematic view taken along line G-G of FIG. 2D to show one approach, not meant to be limiting, of cyclically controlling the feeding of fruits to a staging area atop the peeler cup (not shown) below the chute 180. In FIG. 2G the spring 184 is pushed sufficiently far out of the slot 182 by the trigger rod 151 so that the fruit 20 drops below the spring 184 and the slot 182.

Figure 3A:
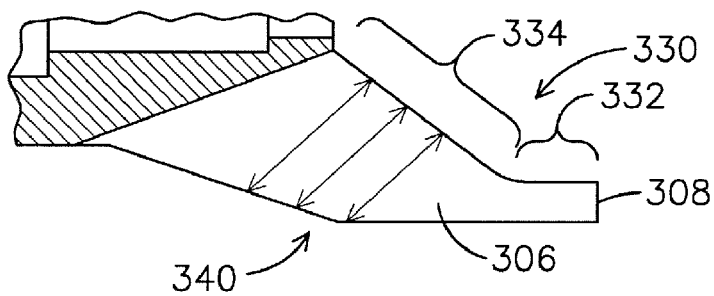
FIG. 3A depicts a side view showing features of a substantially linear peeler blade.

Yet further aspects of embodiments of the invention are better appreciated after discussion of certain properties and characteristics of the peeler blades. FIG. 3A depicts a side view of a representative substantially linear peeler blade 306, the blade 306 comprising an interior contour 330, an exterior contour, 340 and the distal end 308. The interior contour 330 may be subdivided, structurally and/or only functionally, into a more distal, loading region 332 and a more rearward compression region 334. When the contour of latter is linear, as shown, the region 334 of one peeler cup defines the outer side boundaries of a truncated cone, discussed further below. The expanse of blade material between the inner contour 330 and the exterior contour 340 (shown by arrows) in and rearward of the compression region 334 as shown in the various figures, is proportioned so as to be effective to allow for the relatively easy passage of slices of peel during operation of the peeler cups in a juice extraction device at predetermined operating speeds.

The linear interior contour of the compression region 334 has been determined to provide a more effective/efficient extraction than previous curvilinear interior contours, such as were disclosed in U.S. Pat. Nos. 5,655,441, 5,720,218, 5,802, 964, and 5,655,441. Some of such blades are exemplified by a blade 390 depicted in FIG. 3B (shape taken from the lateral (neither top nor bottom) blades in FIG. 4 of U.S. 5,720,219). It is appreciated that for such designs, there is a gradual curve and most or all of the interior contour is involved with the compression function. Also as to other differences from the prior art, FIG. 3C depicts the shape of a longer blade 391 of the prior art bottom, longer blades (shape taken from FIG. 1 of U.S. Pat. No. 5,720,219). It may be appreciated that an inflection point 392 is along the curve at or around which the function and region changes from loading (the more distal region) to compression. Further, it is appreciated that in this and other prior art peeler cup designs, during operation the opposed mated peeler cups separated by a relatively greater distance in order to receive the next fruit for extraction, so that the travel distance, and time, were greater to move one peeler cup into the other in order to move the fruit into mated compression regions.

Further, as to the top openings 114 and 164 and the bottom openings 116 and 166 of FIGS. 1A and 1B, and the like openings of the other depicted embodiments, it is appreciated that most of the area of these openings are in the loading region 332. That is, in various embodiments, the entire area of the top and the bottom openings are in the loading region. In other embodiments between 40 and 90 percent the area of either or both of the top and the bottom openings are in the loading region. And in a number of the latter embodiments, between 60 and 90 percent the area of either or both of the top and the bottom openings are in the loading region. The stated range and sub-range are not meant to be limiting, and all sub-ranges therein, between any integer including range endpoints, are included in the scope of the invention.

Further as to the overall size of the top opening, in various embodiments the size of a top opening of a peeler cup may be predetermined to be between 35 to 55 percent of the largest desired size of fruit to be juiced by the peeler cup (the largest desired fruit size being measured by its largest cross-sectional area). In some of such embodiments, the size of the top opening may be predetermined to be between 40 to 45 percent of the largest desired size of fruit to be juiced by the peeler cup. In other possible embodiments, the size of the top opening may be predetermined to be up to 120 percent of the largest desired size of fruit to be juiced by the peeler cup (in case the opening is in only one of the peelers, as in FIG. 4A).

Expressing this aspect in another way, it is appreciated that when the respective top openings of the first and the second peeler cups are within a particular size range for a given size range of fruit, a relatively narrow lateral gap may be associated with a predetermined open position for the peeler cups relative to each other. This allows for a whole fruit to drop consistently into the space through the top open area comprising the top openings without the fruit shifting to the sides and bursting as the blades converge or otherwise misfeeding. Also, a juice-extracted fruit core may drop through the bottom open area comprising the bottom openings, wherein the size of the bottom openings is effective to retain the whole fruit up entry of the whole fruit into the space. In some such embodiments, where there is a relatively narrow lateral gap, the top openings of the Mendesaddle shapes are sufficiently large for fruit entry that the lateral gap represents less than 25 percent of the maximum diameter of the top open area at the predetermined open position for entry of the fruit. In other embodiments no gap exists in this maximum predetermined open position.

Also, as is depicted in the exemplary embodiment of FIGS. 1A, 1B and 2A-F, a further optional aspect of the invention is that the more distal exterior contour of the blades that form and are adjacent the top opening (i.e., 164) is flat and substantially horizontal as positioned in a fruit extraction device. This, together with an optional extended narrow base rearward region (i.e., 142 in FIG. 2D), rearward of an intermediate angled region 143, have been identified as contributing to fewer misfeeds and overall higher production rate and quality, particularly at higher production rates. Compared to the length of known prior art rearward base regions, which are defined to comprise the narrowed rearward portion of a peeler cup rearward of the point where the blades reduce to the diameter of the peeler cup, the optional extended narrow base rearward region provides a sufficient length along which a fruit may reside during its staging atop the peeler cup, prior to entering the space formed within the peeler cups. In various embodiments, the optional extended narrow base has a length equal to the diameter of the largest fruit juiced in the peeler cups.

EXAMPLE 1

Figure 3B:
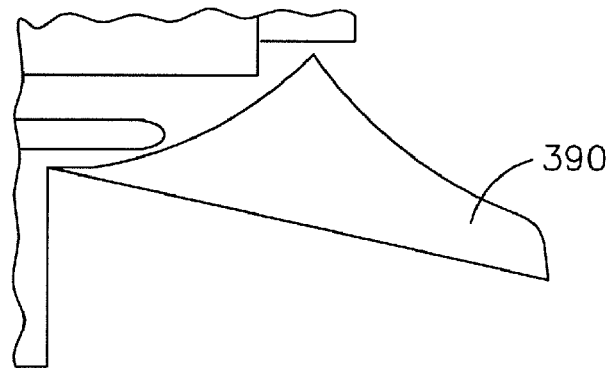
FIG. 3B depicts a prior art peeler blade.
Figure 3C:
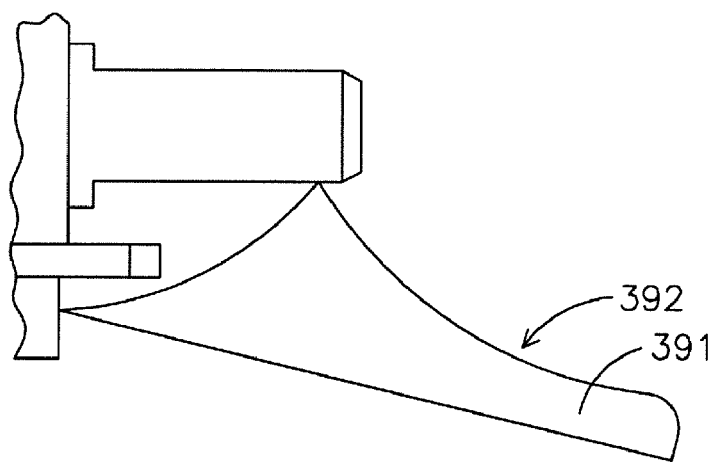
FIG. 3C depicts the shape of one of the longer blades of a prior art peeler cup.

Table 1 provides data of a comparison between juice extraction devices having peeler cups comprising the older, curved blades, such as depicted in FIGS. 3B and 3C, and peeler cups comprising the combined features of the peeler cups in FIG. 1A. The two different filter sizes as indicated were used to demonstrate the strength of the concepts embodied in the new design of peeler cup.

The data in this table indicates a quality gain, assessed here by a decrease in oil content, averages a substantial 22.6 percent. The data also shows that the substantial gains in quality by reduction of oil levels and large increase in juice yields is independent of the size of filter used. Also, an average 7.7 percent greater yield was achieved while obtaining the improved quality. This comparison demonstrates that the new peeler cup design provided a commercially significant improvement.

Figure 4A:
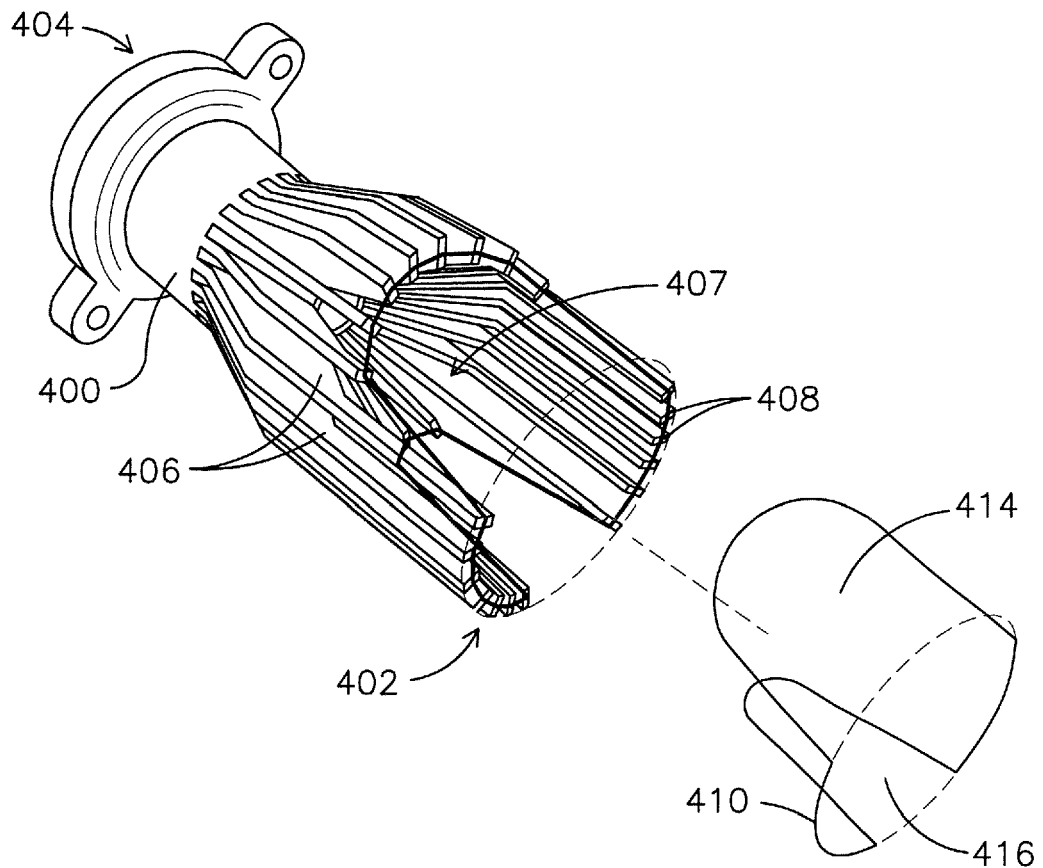
FIG. 4A provides a perspective view of an alternative embodiment of the present invention.

Having so discussed certain features of the present invention, and having provided data in Example 1 that demonstrates improved performance, it is nonetheless appreciated that the sizing and arrangement of the respective top and bottom openings for a pair of intermeshable opposing peeler cups is not meant to be limited to the embodiment of FIGS. 1A-B. FIG. 4A provides an example of one embodiment of the present invention with a perspective view of one peeler cup 400. Peeler cup 400 comprises a forward end 402, a rearward end 404, and comprises a plurality of radially disposed and spaced apart peeling blades 406 that define a space 407 into which a fruit (not shown) may fall. Thereafter, as described above, such fruit may be peeled and compressed for extraction of its juice when the peeler cup 400 is combined with an opposing peeler cup in a device as described herein. These peeler blades 406 each comprise distal ends 408 that collectively define a Mendesaddle shape 410, having however a size of its top opening 414 such that a whole fruit may drop into the space 407 through the top opening 414. Also, the bottom opening 416 is sized so that a juice-extracted fruit core may drop through it (without a need for a matched bottom opening of peeler cups), wherein the size of the bottom opening 416 is effective to retain the whole fruit upon entry of the whole fruit into the space.

Figure 4B:
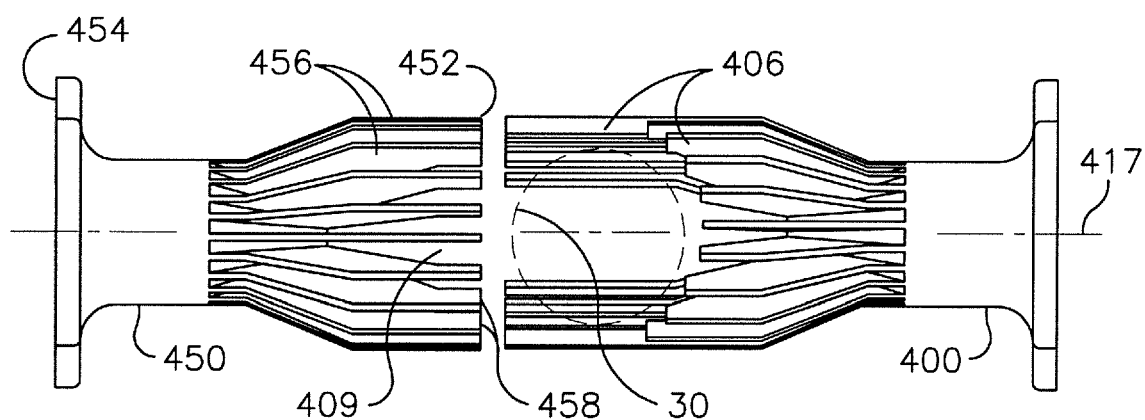
FIG. 4B provides a top view of the peeler cup of FIG. 4A that is paired with a second peeler cup.

FIG. 4B provides a top view of the peeler cup 400 described above that is paired with a second peeler cup 450. In this example second peeler cup 450 is fixed to a chassis (not shown), and peeler cup 400 reciprocates back and forth along axis 417 to achieve the feeding of fruit into the cups 400 and 450 and the extraction of juice from the fruit by such action. One fruit 30 is depicted in peeler cup 400 with dashed lines.

Second peeler cup 450 comprises a forward end 452, a rearward end 454 (where the peeler cup 450 may be bolted to the chassis), and comprises a plurality of radially disposed and spaced apart peeling blades 456 that define a space 409 into which the fruit 30 is compressed by travel of the peeler cup 400 along the axis 417. The peeler cups are aligned so that blades 456 are intermediate blades 406 and they intermesh as peeler cup 450 moves along the axis 417 toward peeler cup 400. In contrast to the blades 406 of peeler cup 400, blades 456 comprise distal ends 458 that collectively form a circular shape, on a plane perpendicular to axis 417, however with no openings for passage of fruit or fruit cores. Nonetheless, the size of the top opening 414 and the bottom opening 416 of peeler cup 400 are sufficient to, respectively, provide for passage of the whole fruit and the fruit core.

For various embodiments such as shown in FIGS. 4A and 4B, as to the overall size of the top opening, the size of a top opening of a peeler cup may be predetermined to be between 100 to 120 percent of the largest desired size of fruit to be juiced by the peeler cup (the latter as measured by its largest cross-sectional area).

Figure 5:
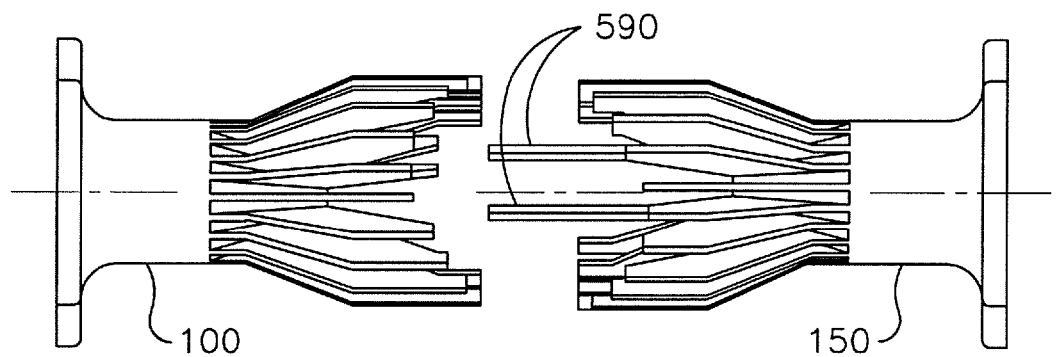
FIG. 5 depicts an alternative embodiment of opposed peeler cups with an overall larger bottom opening in one cup in which are disposed two elongated blades.

In another alternative embodiment, depicted in FIG. 5, one or more elongated blades 590 may be provided. While shown to be affixed to peeler cup 150, in various alternative embodiments these may alternatively be affixed to peeler cup 100. The elongated blades 590 disrupt the incurving of the bottom opening 116, and serve to retain the fruit as it drops from the top opening 114. By providing these elongated blades 590, the blades adjacent to the lateral sides of the bottom opening 116 may be reduced in length. This results, as depicted in FIG. 5, in an overall larger bottom opening 116, albeit in part disrupted by the elongated blades 590. Also, in various of these embodiments, the bottom opening of the peeler cup 100 may be relatively larger than if no elongated blades on peeler cup 150 were present, and this relatively larger bottom opening (particularly if peeler cup 100 is fixed and with the filtering tube), may result in more effective complete ejections of the juice-extracted fruit cores and consequently fewer misfeeds due to such a core being retained in the space when a subsequent fruit is being extracted. Further, in various such embodiments comprising bottom openings 116 that are thusly subdivided, by providing the depicted laterally disposed elongated blades 590 (as opposed to prior art embodiments in which an elongated blade was disposed at the most bottom point) peeler cups so provided may find particular use when relatively small fruit is periodically used, and/or when a relatively larger total bottom open area is desired, such as to provide for greater open area for the cores, or pieces thereof, to fall through.

Figure 6A:
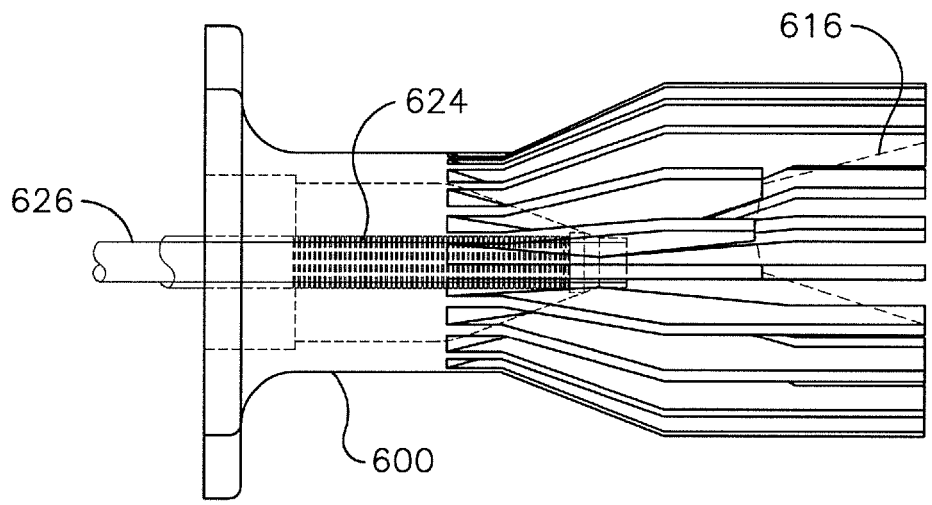
FIG. 6A depicts a bottom view of a first peeler cup of an alternative embodiment.
Figure 6B:
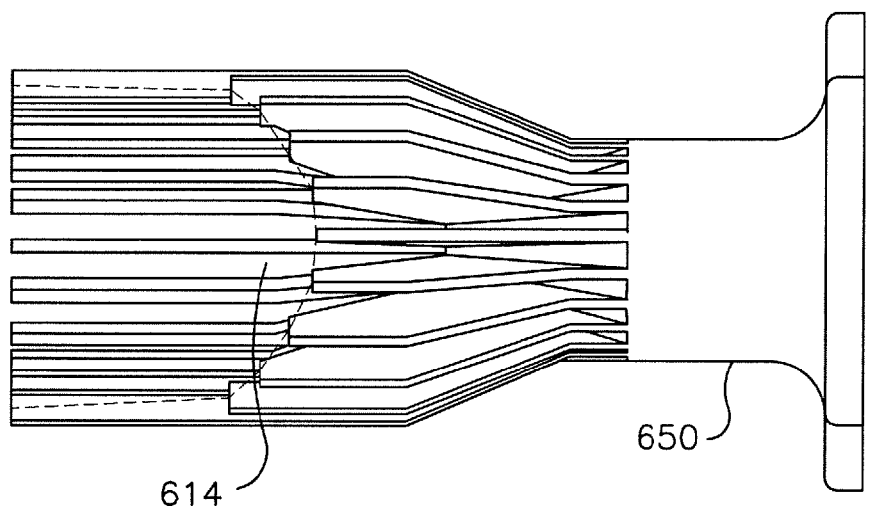
FIG. 6B depicts a top view of a second peeler cup of the alternative embodiment that includes the first peeler cup depicted in FIG. 6A.

In another alternative embodiment, depicted in FIGS. 6A and 6B, a first peeler cup 600, shown FIG. 6A in a bottom view, comprises a bottom opening 616 but no incurving for a top opening. Its paired peeler cup 650, shown in FIG. 6B in a top view, comprises a top opening 614 but no incurving for a bottom opening. These openings 616 and 614 when arranged in the pair of opposing intermeshable peeler cups 600 and 650 may provide closer access to the bottom opening 616 for the expelled core (not shown) when the first peeler cup 600, having the bottom opening 616, also is the cup with the filtering tube 624. In such arrangement, when a piston 626 ejects the juiced core (not shown) it has less distance to travel. Also, with no bottom opening directly below the top opening 614, there is less concern of a very small fruit slipping partially below the plane of the lower peeler blades at the start of the extraction cycle.

It is appreciated that various embodiments of the present invention may comprise any combination of the features described above, as well as the feature described in the following paragraphs.

Having described several variations of peeler cup embodiments of the present invention, another aspect of the present invention is now discussed and described. This aspect may be combined in embodiments with all of the features discussed above, or in embodiments comprising none or any number of such features. This aspect regards a cutting tip associated with the filtering tube, and the distance the cutting tip extends or projects into the space in which the fruit is being extracted. As used herein, a cutting tip may be associated with the filtering tube by means of being a removable component that is attached, directly or indirectly (such as being at one end of a cutting tip assembly), to the filtering tube, such as by a threaded male/female fitting, or by being integral with the filtering tube. The cutting tip functionally may serve to extend the filtering tube a desired distance, and also provides a sharpened edge for cutting a hole, such as a circular hole, into the peel of the fruit.

As noted above, a compression region, whether of a blade comprising a linear or a curved interior contour, is the region where the fruits are compressed and substantially peeled, during which passage therein the juice from the fruits is extracted. As a fruit is being compressed in this region, at a particular time it reaches the cutting tip that may, upon further compression of the fruit onto it, form a hole in the fruit peel through which the juice-laden contents of the fruit will pass into the filtering tube. To achieve this, in various prior art embodiments the cutting tip was set to extend into the space project generally about the thickness of the particular fruits being processed. For example, for fruits that are 50 to 75 millimeters in diameter, the peel thickness generally ranges between 3 and 8 millimeters, and a standard cutting tip extension was 7 millimeters. Peel thickness is greater for larger fruit.

While extracting fruit juice with devices comprising the peeler cups such as described above, the present inventor observed that performance lowered when extracting juice from fruits that were relatively small compared with the size of the peeler cups. By relatively small is meant having a diameter in the lower half of the size range for a particular size of peeler cups. For example, peeler cups having a maximum diameter of 75 millimeters in the extraction region normally are used to extract fruit between 50 and 75 mm. in diameter. The present inventor observed a decrease in quality and yield for fruits 50-62.5 mm diameter compared to fruits of the same variety that were between 62.5 and 75 mm diameter.

The present inventor initially drew on a logic that argued for decreasing the length of the extension of the cutting tip into the extraction space. The reasoning underlying this logic related to the existence of a small "dead space" along the filtering tube between the most distal of the slits in the filtering tube and the distal edge of the cutting tip. Juice-laden fruit that ends up in this dead space at the end of the extraction stroke is not subject to physical forces (i.e., pressure, gravity) that would lead to the collection of the juice, particularly because of the distance to the nearest slit. It was reasoned that by reducing the length of the extension one would shorten the dead space, and thereby be better positioned to obtain a greater percent of the juice in each fruit. In that the dead space represented a relatively larger volume of the total for a relatively smaller fruit, reducing the dead space logically would favor an improvement for relatively smaller fruits.

However, evaluation of this logical approach, to shorten the length of the extension, did not provide a desired improvement in quality and yield.

Subsequently, against the general logic of reducing the length of the extension, the present inventor discovered that extending rather than shortening the length was beneficial, especially in terms of quality, and that extending the cutting tip within a particular distance range provided unexpectedly favorable results.

In view of the above it is appreciated that the present inventor discovered a beneficial effect of extending the cutting tip into the space by a distance greater than the peel thickness (the previously recognized criterion). Thus, the present inventor is the first to recognize that such extension is a result-effective variable. Recognizing such result-effective variable has opened the door to not only developing components and devices that better juice a wider range of fruit sizes for a particular peeler cup pair, but also allows for development and uses of a method to optimize juice quality.

Accordingly, while the prior art has not considered a benefit to extending the distance that the cutting tip extends into the compression region beyond the peel thickness, the present inventor discovered this results-effective variable and identified a range of extension distances that provide unexpectedly good results. These are discussed below with regard to FIG. 7, in various metrics, and in conjunction with examples below.

Figure 7:
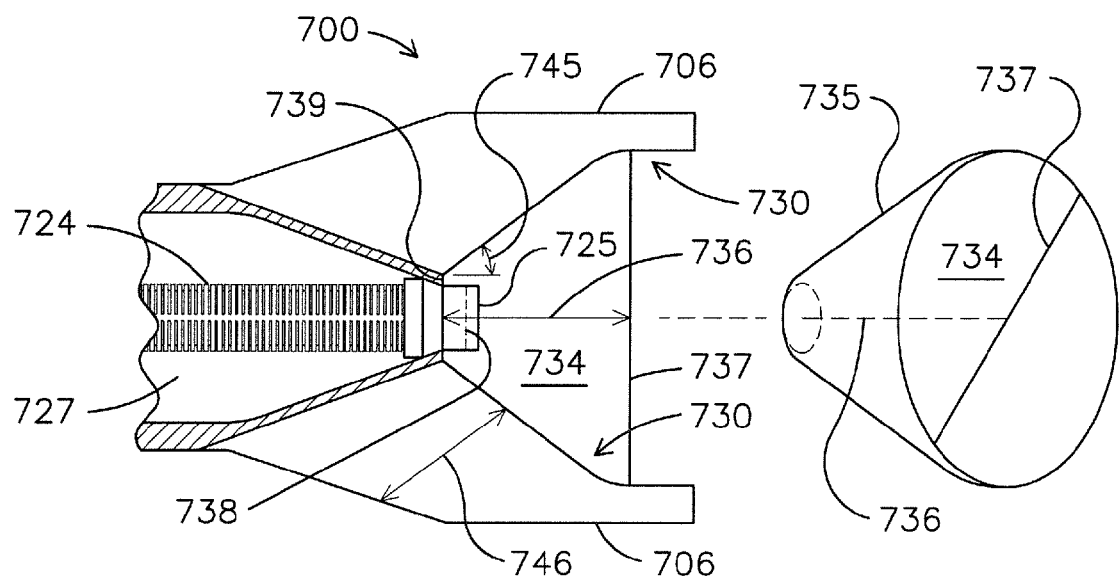
FIG. 7 is a cross-section of a peeler cup taken along a horizontal plane through the center, and through two of the laterally positioned blades. A perspective view of a shape defined by a portion of the blades also is shown.

FIG. 7 is a cross-section of a peeler cup 700 taken along a horizontal plane through the center, and through two laterally positioned blades 706. This figure depicts the above-noted projection of a filtering tube tip and provides an exemplary embodiment of this aspect. While not meant to be limiting, in this depiction, owing to the linearity of the interior contour 730 of the blades 706, a truncated cone 735 represents a particular compression region 734 having a length 736 and a maximum diameter 737. Based on the above discussions, as each fruit is compressed during the extraction stroke the space for the fruit within this cone 735 and the cone of its paired peeler cup (not shown) decreases as the peeling, compression and extraction occur during the extraction stroke. In one embodiment, an angle shown as angle 745 is 32.5 degrees, and the thickness 746 may be from 0.1 to 0.9 times the maximum diameter 737.

It has been discovered that improved juice production occurs for relatively smaller fruits when the cutting tip 725 associated with the filtering tube 724 extends within a range beyond a normal, peel thickness-based extension, and desired ranges of such extension of a filtering tip may be defined according to the following formula:

Range of Extension beyond Normal Extension=$NE(K)$
to ($NE+DCR/NE$), where NE is the maximum normal extension (based on peel thickness), K is a constant, and DCR is the maximum diameter of the compression region. In FIG. 7 NE is depicted as 738 and the cutting tip 725 is shown to extend beyond NE in the range established by this formula. Distances of extension are measured from a surface 739 that establishes the smallest diameter of the cone 735 (or analogous compression region of a different shape).

Applying this formula to a peeler cup having a maximum normal extension NE of 7 mm and a 75 mm maximum diameter of its compression region, when K=1.3 the range of extension is from 9.1 to 17.7 mm. When K=1.5 mm, the range of extension is 10.5 mm to 17.7 mm. It is noted that the inside diameter of the filtering tube that would go into such peeler cup is 20 mm.

Applying this formula to a peeler cup having a maximum normal extension NE of 10 mm and a 105 mm maximum diameter of its compression region, when K=1.3 the range of extension is from 13 to 20.5 mm. When K=1.5 mm, the range of extension is 15 mm to 20.5 mm. It is noted that the inside diameter of the filtering tube that would go into such peeler cup is 25 mm.

The use of these K constants is meant to be illustrative and to provide particular ranges of interest, but is not meant to be limiting. Smaller or larger K values may be selected to result in different ranges.

As shown by way of the examples below, an extension within the ranges thus described has been found to be effective to improve quality of relatively small fruits, that is, fruits that are smaller relative to the size of the spaces formed by the peeler cups (particularly the region for compression and peeling). As stated above, by relatively small is meant having a diameter in the lower half of the size range for a particular size of peeler cups.

The following examples demonstrate representative performance differences in comparison to other tip projection distances, and including variations in sizes and types of oranges, and other factors. The first four examples taken together compare three different distances that fall within the above stated ranges of additional projection of the filtering tube tip into the compression region of the peeler cup.

EXAMPLE 2

Table 2 summarizes results of a side-by-side comparison using peeler cups with the fixed peeler cup holding within its central base a 20 millimeter (mm) diameter filtering tube. The peeler cups used in this example have all features described above for the embodiment depicted in FIGS. 1A and 1B. In the control for this comparison the tip of the filtering tube extends 7 mm, which is the maximum peel-based extension for this size peeler cup, having a 75 mm maximum diameter of the compression region (corresponding to 737 of FIG. 7).

There were two longer projections compared in this comparison trial. A first longer projection was an additional 3 mm from the control's projection, that is, a 10 mm total projection into the compression region. A second longer projection was an additional 5 mm from the control's projection, that is, a 12 mm total projection into the compression region.

For this and all other examples provided herein, approximately 25 kilograms of the indicated fruit was extracted for each run for each treatment per trial, and three runs were conducted for each treatment, including the control 'treatment.' All runs of an example were conducted the same day.

The data in Table 2 indicates that the additional 12 mm projection treatment yielded lower oil in the juice than either the control or the additional 10 mm projection treatment. However, both extension treatments yielded lower peel oil, and thus had better quality by this important criterion, than the control. The juice and pulp yield of the additional 5 mm projection treatment was about one percent less than that of the control, and marginally less than that of the additional 3 mm projection treatment.

EXAMPLE 3

Table 3 summarizes results of a side-by-side comparison using peeler cups with the fixed peeler cup holding within its central base a 20 millimeter (mm) diameter filtering tube. The other features of this peeler cup are the same as those described above in Example 2. Also as for Example 2, in the control for this comparison the tip of the filtering tube extends 7 mm, which is the maximum peel-based extension for this size peeler cup, having a 75 mm maximum diameter of the compression region.

There same two longer projections as in Example 2 are compared in this comparison trial, however using a slightly larger fruit, between about 2.25 to 2.50 inches in diameter (57.2 to 63.5 mm.). The first longer projection was an additional 3 mm from the control's projection, that is, a 10 mm total projection into the compression region. The second longer projection was an additional 5 mm from the control's projection, that is, a 12 mm total projection into the compression region.

As for Table 2 of Example 2, the data in Table 3 indicates that the both the 10 mm and the 12 mm projection treatments yielded lower oil in the juice than the control. Here the differences were much more striking. Also, the juice and pulp yield of the additional 12 mm projection treatment was about 0.6 percent less than that of the control, and marginally less than that of the additional 10 mm projection treatment.

EXAMPLE 4

Table 4 summarizes results of a side-by-side comparison using peeler cups with the fixed peeler cup holding within its central base a 20 millimeter (mm) diameter filtering tube. The other features of this peeler cup are the same as those described above in Example 2. Also as for Example 2, in the control for this comparison the tip of the filtering tube extends 7 mm, which is the maximum peel-based extension for this size peeler cup, having a 75 mm maximum diameter of the compression region.

In this example, the first longer projection being compared was an additional 5 mm from the control's projection, that is, a 12 mm total projection into the compression region. The second longer projection was an additional 10 mm from the control's projection, that is, a 17 mm total projection in the compression region.

Surprisingly, the data in Table 4 indicates that the 12 mm projection treatment yielded lower oil in the juice than not only the control but also compared to the additional 17 mm projection treatment. The somewhat poorer performance as far as oil content, and also yield, of the 17 mm treatment appears to indicate that this is nearing the end of a desired range of extensions. This supports a conclusion that a range that includes the 12 mm projection distance provides unexpected good results given the better performance observed with the 12 mm treatment compared to the additional 17 mm treatment. The juice and pulp yield differences among treatments were greater in this trial, and the 12 mm projection treatment was about 2.2 percent less than that of the control, while the 17 mm projection treatment was about 4.8 percent less than that of the control.

EXAMPLE 5

Table 5 summarizes results of a side-by-side comparison using peeler cups with the fixed peeler cup holding within its central base a 20 millimeter (mm) diameter filtering tube, using a slightly larger fruit, between about 2.25 to 2.50 inches in diameter (57.2 to 63.5 mm.). The other features of this peeler cup are the same as those described above in Example 2. Also as for Example 2, in the control for this comparison the tip of the filtering tube extends 7 mm, which is the maximum peel-based extension for this size peeler cup, having a 75 mm maximum diameter of the compression region.

In this example, there is a second comparison between the 12 mm projection and the 17 mm projection from the control's projection.

The data in Table 5 indicates that the 12 mm projection treatment yielded lower oil in the juice than the control and comparable oil (though fractionally higher) compared to the 17 mm projection treatment. Here, the juice and pulp yield of the 12 mm projection treatment was about 1.4 percent less than that of the control, while the 17 mm projection treatment was about 4.3 percent less than that of the control. The somewhat poorer performance as far as yield of the 17 mm treatment supports the results of Example 4, and that overall better performance is obtained with the 12 mm treatment compared to the additional 17 mm treatment.

The following examples provide data comparing the additional 5 mm projection treatment with the same control as above, however juicing different varieties of fruit.

EXAMPLE 6

A lot of relatively small Valencia variety fruit, having diameters in the range of 2.25 to 2.5 inches, were extracted in devices of the present invention. Table 6 provides the data of analyses of the fruit and of the resultant juice yield from the control and from the 12 mm extended tip projection treatment. The average of these three runs show that the oil content of the juice of the 5 mm extended tip projection treatment (i.e., the 12 mm tip extension) was about 0.016 percent, compared to about 0.035 percent for the control. This is a substantial and beneficial lowering of oil for this treatment. Consistent with the above examples, the yield was slightly lower, here about 0.7 percent lower than the control.

Further, and also unexpectedly, based in part on the above evaluations of Examples, it has been discovered that especially good results are found to occur within particular ranges within the largest range established by the above formula.

Thus, based on the results from the above examples, including the less favorable results with the 17 mm extension compared to the 12 mm extension, an intermediate projection extension for the cutting tip into the compression region provided unexpectedly good results. The range of this intermediate cutting tip extension distance is determined to be between 12 to 23 percent of the DCR, and more particularly between 15 to 19 percent of the DCR.

The relationship of the amount of extension of the cutting tip to the diameter of the filtering tube is an additional metric by which to measure this aspect of the present invention. For example, in various embodiments the cutting tip extends into the extraction region of the peeler cup by a distance greater than half the diameter of the filtering tube. More particularly, in some such embodiments the cutting tip extends into the extraction region of the peeler cup by a distance between 45 percent and 85 percent of the diameter of the filtering tube.

The desired ranges of extension also may be related to the maximum nominal thickness of peel of the fruit to be peeled in the cups. It is well known that fruit will have some variation in peel thickness in different parts of one fruit. Taking this into consideration, maximum nominal thickness of peel is defined as the average peel thickness of the fruits of a representative sample of the largest fruits suitable for a particular peeler cup size. This value also may be variety-specific.

For example, for Valencia oranges, the maximum nominal thickness of peel is 7 mm for a peeler cup pair having a maximum diameter 737 of 75 mm. The maximum nominal thickness of peel for this variety is 10 mm for a peeler cup pair having a maximum diameter 737 of 105 mm. In various embodiments, the extension of a filtering tube into the space (such as space represented by cone 735) is so dimensioned so as to extend greater than 1, and less than 2.5, or alternatively between 1.3 and 2.3, times the maximum nominal thickness of peel of the fruits being processed in a respective device comprising cup pairs of the corresponding fruit size.

Having so described the discovery and shown results in replicated evaluations, it also is appreciated that the above-indicated extension of the cutting tip of the filtering tube is effective to extend the range of fruit size for which a given peeler cup size is effective to provide a desired fruit juice quality and yield.

Figure 8:
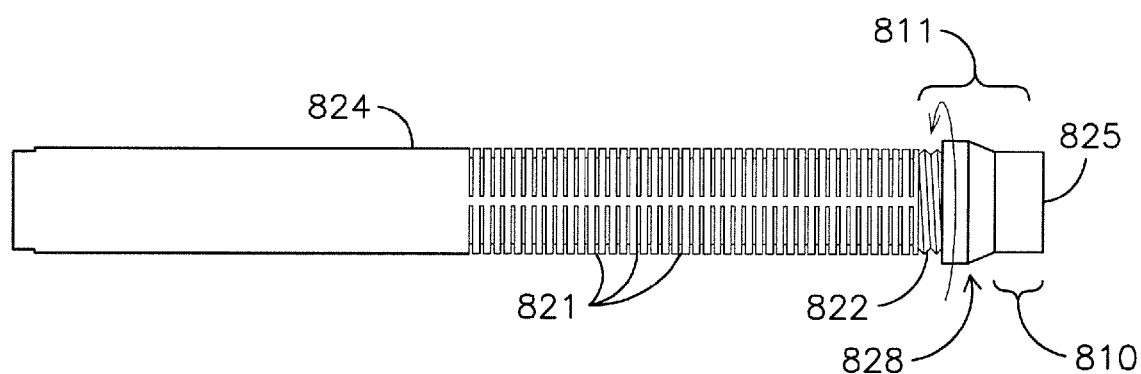
FIG. 8 provides side view of a filtering tube and an associated cutting tip assembly.

FIG. 8 provides an example of a filtering tube 824 having a plurality of slits 821 and a threaded distal end 822. Also depicted is a cutting tip assembly 828 comprising a cutting tip 825. The length of the extension into the extraction region of a peeler cup is shown by the distance 810. The length of the above-noted dead zone is shown by the combined distances indicated by 811. As noted above, a cutting tip may be a removable component that is attached, directly or indirectly, to the filtering tube, such as the cutting tip assembly 828, or it may be formed integrally with the filtering tube.

Having provided the above examples, it is clear that this extension provides benefits as to fruit juice quality while maintaining a desired yield, particularly and surprisingly for relatively smaller fruits. As noted above, this feature may be provided in combination with other aspects of peeler cups described herein.

Also, it is appreciated that the gravity feeding of fruits into the space between the peeler cups, and the role of gravity on the removal of extracted cores from the space, are effective not only when the opposing intermeshing peeler cups are arranged in a device so as to be along a strictly horizontal longitudinal axis. That is, although all embodiments depicted above show the peeler cups to be arranged along a zero-degree horizontal longitudinal axis, embodiments of the invention may be arranged so as to be substantially horizontal and still be within the scope of the invention. For example, the opposing intermeshing peeler cups may be positioned so that their common longitudinal axis is 30 degrees from horizontal. At such angle a gravity feed and staging atop the moving peeler cup may still be effective for dropping the fruit into the space, and the piston thrust and location of the bottom opening may be coordinated to achieve a consistent expulsion at such angle. More generally, any angle of the longitudinal axis of the peeler cups between zero and 45 degrees, including the endpoints, may be considered "substantially horizontal" for the purposes of the invention, and various embodiments that are arranged with the peeler cups substantially horizontal are within the scope of the invention. Also, one criterion of the angle of the longitudinal axis is that at such angle the arrangement of peeler cups is effective to achieve a predetermined gravity feeding of fruits into the space, and a predetermined gravity role for removal of the extracted core from the space. While the above description provides only one pair of peeler cups for the various embodiments, the invention is suitable for multiple paired cup extraction devices such as those described in the publication of Canadian Patent number CA 2347814 and U.S. Patent Application publication numbers 2005/0028690 and 2005/0199138. Such multi-pair devices are well-suited for commercial juice extraction where the various benefits of the present invention leads to improved production rate, juice quality, and overall economic benefit.

Also, it is fully appreciated that the above-described extension of the cutting tip farther into the space of a cup may be utilized in juice extraction devices generally, including and not limited to those cited above having a vertical orientation of extraction cups (e.g., U.S. Pat. Nos. 2,649,730, 2,780,988 and later-issued patents assigned to FMC Corporation). That is, the application of extending the distal end of the cutting tip farther into such space, to obtain improved juice quality, particularly with relatively smaller fruits, is not limited only to the above-disclosed intermeshing peeler cups that are utilized in substantially horizontal juice extraction devices.

All patents, patent applications, patent publications, and other publications referenced herein are hereby incorporated by reference in this application in order to more fully describe the state of the art to which the present invention pertains, to provide such teachings as are generally known to those skilled in the art. More specifically, Applicant's cited patents and patent publications are incorporated for their descriptions of known features of these extraction devices.

While various embodiments of the present invention have been shown and described herein, it will be obvious that such embodiments are provided by way of example only. Numerous variations, changes and substitutions may be made without departing from the invention herein. Moreover, when any range is understood to disclose all values therein and all sub-ranges therein, including any sub-range between any two numerical values within the range, including the endpoints. Accordingly, it is intended that the invention be limited only by the spirit and scope of the appended claims.

TABLE 1

FRUIT: VALENCIA variety

| RUN # | Filter (mm) | Old peeler cup configuration in single-cup-pair extraction devices | | New peeler cup configuration in multi-cup-pair extraction devices | | Quality Gain (%) | Yield Gain (%) |
|---|---|---|---|---|---|---|---|
| | | Oil (%) | Yield (%) | Oil (%) | Yield (%) | | |
| 1 | 0.5 | 0.013 | 51.1 | 0.011 | 55.9 | 15.4 | 9.4 |
| | 1.0 | 0.015 | 54.5 | 0.010 | 59.3 | 33.3 | 8.8 |
| | 0.5 | 0.013 | 53.3 | 0.011 | 55.6 | 15.4 | 4.3 |
| | 1.0 | 0.026 | 56.9 | 0.021 | 60.1 | 19.2 | 5.6 |
| | | Test Average | | | | 20.8 | 7.0 |
| 2 | 0.5 | 0.013 | 49.0 | 0.010 | 55.3 | 23.1 | 12.9 |
| | 1.0 | 0.016 | 50.8 | 0.012 | 57.7 | 25.0 | 13.6 |
| | 0.5 | 0.014 | 54.1 | 0.010 | 55.6 | 28.6 | 2.8 |
| | 1.0 | 0.024 | 57.3 | 0.019 | 59.8 | 20.8 | 4.4 |
| | | Test Average | | | | 24.4 | 8.4 |
| | | General Quality & Yield Gain Averages | | | | 22.6 | 7.7 |

TABLE 2

FRUIT: Pera Rio
Fruit Size: 2.0" to 2.25" diameter (50.8 mm to 57.2 mm)

| Machine Size | TREATMENT DESCRIPTION | Run | Brix | Acid | Ratio | Oil | Color | Fruit Kg | Juice & Pulp Kg | Juice & Pulp Yield % |
|---|---|---|---|---|---|---|---|---|---|---|
| 870 | Control, | 1 | 12.0 | 0.592 | 20.3 | 0.045 | 38 | 25.000 | 15.655 | 62.6 |
| | 7 mm tip extension | 2 | 12.0 | 0.584 | 20.5 | 0.045 | 38 | 25.000 | 15.840 | 63.4 |
| | | 3 | 12.4 | 0.592 | 20.9 | 0.043 | 38 | 25.000 | 15.640 | 62.6 |
| | | Average | | | | 0.044 | | | | 62.8 |
| 870 | 10 mm tip extension | 1 | 12.6 | 0.615 | 20.5 | 0.036 | 38 | 25.000 | 15.440 | 61.8 |
| | (3 mm beyond control) | 2 | 12.6 | 0.607 | 20.8 | 0.040 | 38 | 25.000 | 15.500 | 62.0 |
| | | 3 | 12.4 | 0.592 | 20.9 | 0.039 | 38 | 25.000 | 15.520 | 62.1 |
| | | Average | | | | 0.042 | | | | 62.5 |
| 870 | 12 mm tip extension | 1 | 12.2 | 0.584 | 20.9 | 0.033 | 38 | 25.000 | 15.580 | 62.3 |
| | (5 mm beyond control) | 2 | 12.4 | 0.599 | 20.7 | 0.034 | 38 | 25.000 | 15.300 | 61.2 |
| | | 3 | 12.6 | 0.607 | 20.8 | 0.036 | 38 | 25.000 | 15.365 | 61.5 |
| | | Average | | | | 0.040 | | | | 62.2 |

TABLE 3

FRUIT: Pera Rio
Fruit Size: 2.25" to 2.50" diameter (57.2 mm to 63.5 mm)

| Machine Size | TREATMENT DESCRIPTION | Run | Brix | Acid | Ratio | Oil | Color | Fruit Kg | Juice & Pulp Kg | Juice & Pulp Yield % |
|---|---|---|---|---|---|---|---|---|---|---|
| 870 | Control, | 1 | 11.4 | 0.538 | 21.2 | 0.051 | 38 | 25.000 | 16.155 | 64.6 |
|  | 7 mm tip extension | 2 | 11.6 | 0.530 | 21.9 | 0.058 | 38 | 25.000 | 16.215 | 64.9 |
|  |  | 3 | 11.4 | 0.546 | 20.9 | 0.056 | 38 | 25.000 | 16.305 | 65.2 |
|  |  | Average |  |  |  | 0.055 |  |  |  | 64.9 |
| 870 | 10 mm tip extension | 1 | 11.4 | 0.569 | 20.0 | 0.037 | 38 | 25.000 | 16.115 | 64.5 |
|  | (3 mm beyond control) | 2 | 11.8 | 0.569 | 20.7 | 0.033 | 38 | 25.000 | 16.075 | 64.3 |
|  |  | 3 | 11.6 | 0.553 | 21.0 | 0.032 | 38 | 25.000 | 16.155 | 64.6 |
|  |  | Average |  |  |  | 0.034 |  |  |  | 64.5 |
| 870 | 12 mm tip extension | 1 | 11.6 | 0.553 | 21.0 | 0.028 | 38 | 25.000 | 16.105 | 64.4 |
|  | (5 mm beyond control) | 2 | 11.4 | 0.561 | 20.3 | 0.030 | 38 | 25.000 | 16.125 | 64.5 |
|  |  | 3 | 11.4 | 0.553 | 20.6 | 0.030 | 38 | 25.000 | 15.985 | 63.9 |
|  |  | Average |  |  |  | 0.029 |  |  |  | 64.3 |

TABLE 4

FRUIT: Pera Rio
Fruit Size: 2.0" to 2.25" diameter (50.8 mm to 57.2 mm)

| Machine Size | TREATMENT DESCRIPTION | Run | Brix | Acid | Ratio | Oil | Color | Fruit Kg | Juice & Pulp Kg | Juice & Pulp Yield % |
|---|---|---|---|---|---|---|---|---|---|---|
| 870 | Control, | 1 | 10.0 | 0.922 | 10.8 | 0.022 | 36 | 25.000 | 16.000 | 64.0 |
|  | 7 mm tip extension | 2 | 10.0 | 0.876 | 11.4 | 0.022 | 36 | 25.000 | 15.940 | 63.8 |
|  |  | 3 | 10.0 | 0.884 | 11.3 | 0.025 | 36 | 25.000 | 15.730 | 62.9 |
|  |  | Average |  |  |  | 0.023 |  |  |  | 63.6 |
| 870 | 12 mm tip extension | 1 | 10.0 | 0.922 | 10.8 | 0.020 | 36 | 25.000 | 15.480 | 61.9 |
|  | (5 mm beyond control) | 2 | 10.0 | 0.922 | 10.8 | 0.017 | 36 | 25.000 | 15.270 | 61.1 |
|  |  | 3 | 10.0 | 0.892 | 11.2 | 0.021 | 36 | 25.000 | 15.335 | 61.3 |
|  |  | Average |  |  |  | 0.019 |  |  |  | 61.4 |
| 870 | 17 mm tip extension | 1 | 10.0 | 0.922 | 10.8 | 0.026 | 36 | 25.000 | 14.545 | 58.2 |
|  | (10 mm beyond control) | 2 | 10.0 | 0.915 | 10.9 | 0.024 | 36 | 25.000 | 14.670 | 58.7 |
|  |  | 3 | 10.0 | 0.884 | 11.3 | 0.022 | 36 | 25.000 | 14.900 | 59.6 |
|  |  | Average |  |  |  | 0.024 |  |  |  | 58.8 |

TABLE 5

FRUIT: Pera Rio
Fruit Size: 2.25" to 2.50" diameter (57.2 mm to 63.5 mm)

| Machine Size | TREATMENT DESCRIPTION | Run | Brix | Acid | Ratio | Oil | Color | Fruit Kg | Juice & Pulp Kg | Juice & Pulp Yield % |
|---|---|---|---|---|---|---|---|---|---|---|
| 870 | Control, | 1 | 10.0 | 0.715 | 14.0 | 0.023 | 36 | 25.000 | 17.025 | 68.1 |
|  | 7 mm tip extension | 2 | 10.0 | 0.753 | 13.3 | 0.020 | 36 | 25.000 | 17.025 | 68.1 |
|  |  | 3 | 10.0 | 0.753 | 13.3 | 0.020 | 36 | 25.000 | 17.060 | 68.2 |
|  |  | Average |  |  |  | 0.021 |  |  |  | 68.1 |
| 870 | 12 mm tip extension | 1 | 10.0 | 0.784 | 12.8 | 0.018 | 36 | 25.000 | 16.630 | 66.5 |
|  | (5 mm beyond control) | 2 | 10.0 | 0.776 | 12.9 | 0.018 | 36 | 25.000 | 16.615 | 66.5 |
|  |  | 3 | 10.0 | 0.730 | 13.7 | 0.017 | 36 | 25.000 | 16.745 | 67.0 |
|  |  | Average |  |  |  | 0.018 |  |  |  | 66.7 |
| 870 | 17 mm tip extension | 1 | 10.0 | 0.745 | 13.4 | 0.018 | 36 | 25.000 | 16.005 | 64.0 |
|  | (10 mm beyond control) | 2 | 10.0 | 0.745 | 13.4 | 0.015 | 36 | 25.000 | 16.020 | 64.1 |
|  |  | 3 | 10.0 | 0.776 | 12.9 | 0.017 | 36 | 25.000 | 15.830 | 63.3 |
|  |  | Average |  |  |  | 0.017 |  |  |  | 63.8 |

TABLE 6

FRUIT: Valencia
Fruit Size: 2.25" to 2.50" diameter (57.2 mm to 63.5 mm)

| Machine Size | TREATMENT DESCRIPTION | Run | Brix | Acid | Ratio | Oil | Color | Fruit Kg | Juice & Pulp Kg | Juice & Pulp Yield % |
|---|---|---|---|---|---|---|---|---|---|---|
| 870 | Control, | 1 | 8.4 | 1.584 | 5.3 | 0.035 | 33 | 25.020 | 14.555 | 58.2 |
|  | 7 mm tip extension | 2 | 8.4 | 1.536 | 5.5 | 0.040 | 33 | 25.090 | 14.590 | 58.2 |
|  |  | 3 | 8.6 | 1.536 | 5.6 | 0.031 | 33 | 25.050 | 14.540 | 58.0 |
|  |  | Average |  |  |  | 0.035 |  |  |  | 58.1 |

TABLE 6-continued

FRUIT: Valencia
Fruit Size: 2.25" to 2.50" diameter (57.2 mm to 63.5 mm)

| Machine Size | TREATMENT DESCRIPTION | Run | Brix | Acid | Ratio | Oil | Color | Fruit Kg | Juice & Pulp Kg | Juice & Pulp Yield % |
|---|---|---|---|---|---|---|---|---|---|---|
| 870 | 12 mm tip extension (5 mm beyond control) | 1 | 8.4 | 1.560 | 5.4 | 0.018 | 33 | 25.070 | 14.500 | 57.8 |
| | | 2 | 8.4 | 1.607 | 5.2 | 0.016 | 33 | 25.000 | 14.315 | 57.3 |
| | | 3 | 8.4 | 1.646 | 5.1 | 0.015 | 33 | 25.090 | 14.300 | 57.0 |
| | | Average | | | | 0.016 | | | | 57.4 |

What is claimed is:

1. A fruit juice extraction device comprising:
a first peeler cup comprising a forward end and a rearward end and comprising a plurality of radially disposed and spaced apart peeling blades partially defining a space for a fruit, the blades comprising interior contours and exterior contours and distal ends defining a shape comprising forwardly disposed lateral arcs, and a top opening and a bottom opening extending toward the first peeler cup rearward end from the lateral arcs; and
a second peeler cup comprising a forward end and a rearward end and comprising a plurality of radially disposed and spaced apart peeling blades partially defining the space for the fruit, the blades comprising interior contours and exterior contours and also comprising distal ends defining a shape comprising forwardly disposed lateral arcs, and a top opening and a bottom opening extending toward the second peeler cup rearward end from the later arcs; and
a filtering tube disposed within one of the peeler cups and a cutting tip associated with the filtering tube so dimensioned as to extend into the space by a distance in a range between 1.43 to 1.71 times a maximum nominal thickness of peel of the fruit to be peeled in the cups;
wherein the shapes are formed such that, when the first and second peeler cups are at a predetermined open position relative to each other and are aligned in a desired relation to gravity, the juxtaposed shapes define top and bottom openings to the space sized such that a whole fruit may drop into the space through a top open area comprising the top openings and a juice-extracted fruit core may drop through a bottom open area comprising the bottom openings, and wherein the size of the bottom openings is effective to retain the whole fruit upon entry of the whole fruit into the space;
wherein the second peeler cup comprises: toward its rearward end an extended narrow base rearward region effective to support the whole fruit prior to its entry into the space; a distal straight portion of the respective blades' exterior contours, the straight portion effective to provide a substantially horizontal trajectory for the whole fruit prior to its entry into the space; and an angled region of the respective blades' exterior contours disposed between the extended narrow base rearward region and the straight portion; and
wherein the blades of the first and the second peeler cups each comprise an inner contour comprising a more distal, linear loading region and a more rearward, linear extraction region.

2. A pair of intermeshable fruit juice extraction peeler cups comprising:
a first peeler cup comprising a forward end and a rearward end and comprising a plurality of radially disposed and spaced apart peeling blades partially defining a space for a whole fruit, each blade comprising an interior contour, an exterior contour, and a distal end; and
a second peeler cup comprising a forward end and a rearward end and comprising a plurality of radially disposed and spaced apart peeling blades partially defining the space for the whole fruit, each blade comprising an interior contour, an exterior contour, and a distal end;
wherein the distal ends of at least one of the first and the second peeler cups' blades define a first shape comprising forwardly disposed lateral arcs and a top opening extending rearward and sized to permit entry of a predetermined portion of a whole fruit into the space, and the distal ends of at least one of the first and the second peeler cups' blades define a second shape comprising forwardly disposed lateral arcs and a bottom opening extending rearward and sized to permit passage of a predetermined portion of a juice-extracted core from the space while small enough not to pass the whole fruit;
wherein blades adjacent the bottom opening are spaced to hold the whole fruit;
and wherein a filtering tube and a cutting tip associated therewith are associated with one of the first or the second peeler cup, and wherein the cutting tip is so dimensioned as to extend into the space by a distance in a range between 50 percent and 60 percent of an inside diameter of the filtering tube.

3. The pair of intermeshable fruit juice extraction peeler cups of claim 2, wherein
the first peeler cup distal ends are configured to form an incurve for the bottom opening but no incurving for the top opening; and
the second peeler cup distal ends are configured to form an incurve for the top opening but no incurving for the bottom opening.

4. A fruit juice extraction device comprising the pair of intermeshable fruit juice extraction peeler cups of claim 2.

5. The pair of intermeshable fruit juice extraction peeler cups of claim 2, wherein the distal ends of at least one of the first and the second peeler cups' blades define a Mendesaddle shape.

6. The pair of intermeshable fruit juice extraction peeler cups of claim 5, the second peeler cup comprising toward its rearward end an extended narrow base rearward region effective to support the fruit whole fruit prior to its entry into the space.

7. The pair of intermeshable fruit juice extraction peeler cups of claim 6, the blades of the second peeler cup comprising a distal straight portion of their respective exterior contours, the straight portion effective to provide a substantially horizontal trajectory for the whole fruit prior to its entry into the space.

8. The pair of intermeshable fruit juice extraction peeler cups of claim 7, the blades of the second peeler cup comprising an angled region of their respective exterior contours disposed between extended narrow base rearward region and the straight portion.

9. The pair of intermeshable fruit juice extraction peeler cups of claim 2, wherein the distal ends of both the first and the second peeler cups' blades define respective Mendesaddle shapes that are formed such that, when the first and second peeler cups are at a predetermined open position relative to each other and are aligned in a desired relation to gravity, the juxtaposed Mendesaddle shapes each define top and bottom openings to the space sized such that a whole fruit may drop into the space through a top open area comprising the top openings and a juice-extracted fruit core may drop through a bottom open area comprising the bottom openings, and wherein the size of the bottom openings is effective to retain the whole fruit upon entry of the whole fruit into the space.

10. A fruit juice extraction device comprising the peeler cups of claim 9.

11. The pair of intermeshable fruit juice extraction peeler cups of claim 2, wherein the distal ends of at least one of the first and the second peeler cups' blades define a birecessed circuloform shape.

12. A fruit juice extraction device comprising:
a first cup comprising a plurality of blades extending from proximate a filtering tube, wherein inside surfaces of the blades partially define a space for receiving a fruit to be juiced; and
a cutting tip associated with the filtering tube and so dimensioned as to extend into the space by a distance in a range between 1.43 to 1.71 times a maximum nominal thickness of peel of the fruit to be peeled in the cups.

13. A fruit juice extraction device comprising:
a first cup comprising a plurality of blades extending from proximate a filtering tube, wherein inside surfaces of the blades partially define a space for receiving a fruit to be juiced; and
a cutting tip associated with the filtering tube and so dimensioned as to extend into the space by a distance in a range between 13.3 and 16.0 percent of a maximum diameter of a compression region of the space.

14. A fruit juice extraction device comprising:
a first cup comprising a plurality of blades extending from proximate a filtering tube, wherein inside surfaces of the blades partially define a space for receiving a fruit to be juiced; and
a cutting tip associated with the filtering tube and so dimensioned as to extend into the space by a distance in a range between 50 percent to 60 percent of an inside diameter of the filtering tube.

* * * * *